(12) United States Patent
Bridges et al.

(10) Patent No.: US 12,432,580 B1
(45) Date of Patent: Sep. 30, 2025

(54) SYSTEMS AND METHODS FOR AUTOMATIC REDUNDANT CONNECTIONS

(71) Applicant: Cable Television Laboratories, Inc., Louisville, CO (US)

(72) Inventors: Mark Bridges, Brooks, GA (US); Gregory C. White, Louisville, CO (US); John C. Bahr, Superior, CO (US); Zenon Mykytyn, Parker, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 340 days.

(21) Appl. No.: 18/046,813

(22) Filed: Oct. 14, 2022

Related U.S. Application Data

(60) Provisional application No. 63/391,514, filed on Jul. 22, 2022, provisional application No. 63/255,822, filed on Oct. 14, 2021.

(51) Int. Cl.
 *H04W 24/04* (2009.01)
(52) U.S. Cl.
 CPC ................................. *H04W 24/04* (2013.01)

(58) Field of Classification Search
 CPC .............................. H04W 24/04; H04W 36/00
 USPC ........................................... 370/328; 455/312
 See application file for complete search history.

(56) References Cited

U.S. PATENT DOCUMENTS

| | | | |
|---|---|---|---|
| 2014/0100671 A1* | 4/2014 | Losee | H02J 7/34 700/22 |
| 2015/0063323 A1* | 3/2015 | Sadek | H04W 56/001 370/336 |
| 2021/0211961 A1* | 7/2021 | Bonnet | H04W 36/26 |
| 2021/0297978 A1* | 9/2021 | Lee | H04W 60/00 |
| 2022/0096852 A1* | 3/2022 | Alvarez | G08B 25/10 |

* cited by examiner

*Primary Examiner* — Marcos Batista
(74) *Attorney, Agent, or Firm* — PdZ Patent Law, PLLC

(57) ABSTRACT

A method for automatic redundant connections includes (1) receiving a first notification message indicating a problem with a primary wide area network (WAN) communication link serving a local area network and (2) in response to receiving the first notification message, establishing a first backup WAN communication link to serve the LAN, using a WAN communication link of a first user equipment device connected to the LAN. The WAN communication link of the first user equipment device is, for example, a wireless communication link.

35 Claims, 29 Drawing Sheets

SYSTEMS AND METHODS FOR AUTOMATIC REDUNDANT CONNECTIONS

CROSS REFERENCE TO RELATED APPLICATIONS

This application claims the benefit of priority to (a) U.S. Provisional Patent Application No. 63/255,822, filed on Oct. 14, 2021, and (b) U.S. Provisional Patent Application No. 63/391,514, filed on Jul. 22, 2022. Each of the aforementioned patent applications is incorporated herein by reference.

BACKGROUND

Reliable Internet access is essential in many applications. For example, a person working from home via the Internet may be unable to perform their job, and possibly loose income, if their Internet access fails. As another example, a student remotely attending school via the Internet may miss important classes should their Internet access fail.

DETAILED DESCRIPTION OF THE EMBODIMENTS

Backup Internet access is typically realized using a mobile "hotspot," which is a device that interfaces a user equipment device with a cellular wireless access communication network. Use of a conventional mobile hotspot as a backup device, though, has significant drawbacks. For example, a user must manually connect their device to the hotspot when their Internet access fails, resulting in downtime, user inconvenience, and possible user stress. Additionally, a conventional mobile hotspot may not be capable of supporting all network clients at a given location, especially if the network clients are not physically close to the mobile hotspot.

Disclosed herein are systems and methods for automatic redundant connections which at least partially overcome the problems discussed above. Particular embodiments of the new systems and methods are configured to leverage respective wide area network (WAN) communication links of one or more user equipment (UE) devices connected to a local area network (LAN), to automatically establish a backup WAN communication link to serve the LAN in case a primary WAN communication link serving the LAN fails. For example, certain embodiments are configured to automatically use a cellular and/or satellite WAN communication link of a mobile phone or other user equipment device connected to a LAN as a backup WAN communication link for the LAN. Additionally, some embodiments are configured to establish a backup WAN communication link without requiring any user action, which may minimize, or even essentially eliminate, downtime from primary WAN communication link failure, as well as help minimize user inconvenience and user stress associated with primary WAN communication link failure. Furthermore, particular embodiments are capable of supporting multiple clients of a LAN via a backup WAN communication link, including clients that may not be physically close to a UE device providing the backup WAN communication link. Moreover, certain embodiments allow a user to identify specific LAN clients that are allowed to use a backup WAN communication link, such as to help prevent congestion of the backup WAN communication link, to help minimize data usage by the UE device providing the backup WAN communication link, and/or to help minimize cost of using the UE device to provide the backup WAN communication link. Additionally, some embodiments provide feedback to a user that a backup WAN communication link is in use and/or provide an accounting of data usage by the backup WAN communication link.

Figure 1:
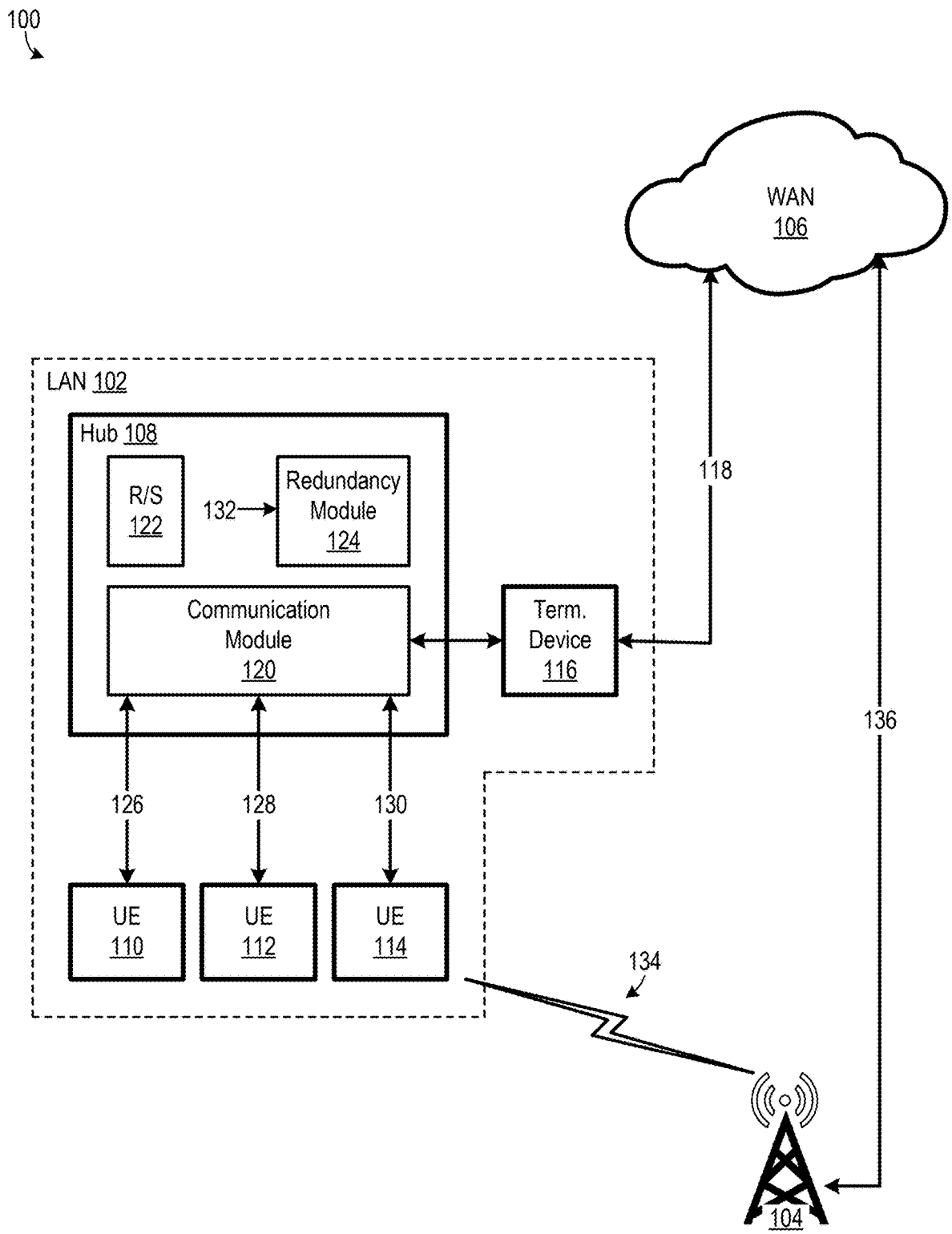
FIG. 1 is a block diagram of a communication environment including a system for automatic redundant connections, according to an embodiment.

FIG. 1 is a block diagram of a communication environment 100 including a system for automatic redundant connections, which is one embodiment of the new systems disclosed herein. Communication environment 100 includes a LAN 102, a wireless communication node 104, and a WAN 106. WAN 106 includes, for the example, the Internet and/or a private WAN. In certain embodiments, WAN 106 includes a cable access communication network, a digital subscriber line (DSL) access communication network, an optical access communication network (e.g., an Ethernet passive optical network (EPON) access communication network, a radio frequency of over glass (RFOG or RFoG) access communication network, a Gigabit-capable passive optical network (GPON) access communication network, a coherent passive optical network (CPON) access communication network, a cellular wireless access communication network using licensed or unlicensed spectrum (e.g., a cellular wireless access communication network operating according to a 3GPP standard, including but not limited to a long term evolution (LTE) cellular wireless access communication network, a fifth generation (5G) cellular wireless access communication network, a sixth generation (6G) cellular wireless access communication network), a Wi-Fi wireless access communication network, a long range (LoRa) access communication network, a satellite wireless access communication network (e.g., using very low earth orbit (VLEO) satellites, low earth orbit (LEO) satellites, medium earth orbit (MEO) satellites, or geostationary equatorial orbit (GEO) satellites), and/or a free space optical wireless access communication network.

LAN 102 includes a hub 108, a UE device 110, a UE device 112, a UE device 114, and a termination device 116. Termination device 116 interfaces LAN 102 with a primary WAN communication link 118. In some embodiments, termination device 116 includes a wireline modem, such as a cable modem or a DSL modem. In some other embodiments, termination device 116 includes a wireless modem. In some additional embodiments, termination device 116 includes an optical network terminal (ONT) or similar device.

Primary WAN communication link 118 serves LAN 102 by carrying data between LAN 102 and WAN 106. In certain embodiments, primary WAN communication link 118 includes a wireline communication link, such as a cable wireline communication link, a DSL communication link, or an optical wireline communication link (e.g., an EPON communication link, a RFOG or RFOG communication link, a GPON communication link, a CPON communication link, or successors or evolutions of any of the foregoing types of communication links). In some other embodiments, primary WAN communication link 118 includes a wireless communication link, such as a fixed cellular wireless communication link (e.g., a fixed cellular wireless communication link operating according to a 3GPP standard, including but not limited to an LTE cellular wireless communication link, a 5G cellular wireless communication link, and/or a 6G cellular wireless communication link) using licensed or unlicensed spectrum, a Wi-Fi wireless communication link, or a wireless communication link with another type of protocol using licensed or un-licensed spectrum, a satellite wireless communication link (e.g., using a VLEO satellite, a LEO satellite, a MEO satellite, or a GEO satellite), or a free space optical wireless communication link. Primary WAN communication link 118 may also include two or more communication links, which need not be of the same type, communicatively coupled in series and/or in parallel.

Each of UE device 110, UE device 112, and UE device 114 is a client of LAN 102. In this document, a UE device may include, but is not limited to, a mobile phone, a computer, a set-top device, a data storage device, an Internet of Things (IoT) device, an entertainment device, a computer networking device, a smartwatch, a wearable device with wireless capability, a medical device, a security device, a monitoring device, and a wireless access device (including, for example, an eNB, a gNB, a Wi-Fi-based wireless access point, a range extender, a mesh wireless access point, an integrated access and backhaul (IAB) access point, a microcell, a picocell, a femtocell, a macrocell, a Wi-Fi-based application, a satellite communication device, etc.). While LAN 102 is illustrated as including three UE devices, the quantity of UE devices in LAN 102 may vary, and each UE device need not be of the same type.

Hub 108 is configured to communicatively interface clients of LAN 102, e.g., UE device 110, UE device 112, and UE device 114, with a termination device, such as termination device 116 or a UE device serving as a termination device of a backup WAN communication link. Additionally, hub 108 is configured communicatively interface clients of LAN 102, e.g., UE device 110, UE device 112, and UE device 114, with each other. In certain embodiments, hub 108 is a network router and/or a network switch. Additionally, in particular embodiments, termination device 116 and hub 108 are co-packaged such that hub 108 is a network gateway. Hub 108 includes a communication module 120, a routing and switching (R/S) module 122, and a redundancy module 124. Although the modules of hub 108 are depicted as being separate elements, two or more of these modules may be partially or fully combined. For example, in certain embodiment, two or more of communication module 120, R/S module 122, and redundancy module 124 are at least partially implemented by common hardware, common software, and/or common firmware.

Communication module 120 is configured to communicatively interface clients of LAN 102, e.g., UE device 110, UE device 112, and UE device 114, with hub 108. In some embodiments, communication module 120 includes one or more radios for wirelessly communicating with clients of LAN 102. Additionally, in particular embodiments, communication module 120 includes one or more wired interfaces for communicating with clients of LAN 102. UE device 110, UE device 112, and UE device 114 are communicatively coupled with hub 108 via a LAN communication link 126, a LAN communication link 128, and a LAN communication link 130, respectively. In some embodiments, one or more of LAN communication links 126, 128, and 130 is a Wi-Fi wireless communication link (e.g., operating in a 900 megahertz (MHz) band, a 2.4 gigahertz (GHz) band, a 5 GHz band, a 6 GHz band and/or a 60 GHz band), a Bluetooth wireless communication link, a Zigbee wireless communication link, a Z-Wave wireless communication link, a Wi-Fi direct wireless communication link, LoRa wireless communication link, or a free space optical wireless communication link. Furthermore, in particular embodiments, one or more of LAN communication links 126, 128, and 130 is a cellular wireless communication link, such as part of a private cellular wireless communication network (e.g., operating according to a 3GPP standard) operating in licensed or unlicensed spectrum. Moreover, in certain embodiments, one or more of LAN communication links 126, 128, and 130 is a wired communication link, such as an electrical cable communication link (e.g., an Ethernet cable, a Universal Serial Bus (USB) cable, a coaxial cable, a telephone cable, etc.), an optical cable communication link, a home networking communication link (e.g., operating according to a Multi-Media over Coax (MoCA) standard or a HomePNA (G.hn) standard), or a power line communication (PLC) communication link. Each of LAN communication links 126, 128, and 130 need not be the same type of communication link.

R/S module 122 is configured to cooperate with communication module 120 to route data between clients of LAN 102, e.g., UE device 110, UE device 112, and UE device 114, and termination device 116, as well as to route data between clients of LAN 102 and a UE device serving as a termination device of a backup WAN communication link. Additionally, R/S module 122 is configured to cooperate with communication module 120 to route data between clients of LAN 102, e.g., between UE device 110, UE device 112, and UE device 114. Redundancy module 124 is configured to cooperate with one or more UE device clients of LAN 102 to establish a backup WAN communication link for serving LAN 102 in case of a problem with primary WAN communication link 118, as discussed below.

At least one of UE device 110, UE device 112, and UE device 114 is configured to communicate with wireless communication node 104 such that the UE device has its own WAN communication link enabling it to communicate with WAN 106 independently of LAN 102. For example, FIG. 1 depicts a wireless communication link 134 between UE device 114 and wireless communication node 104. Wireless communication link 134 may be considered part of a WAN communication link for UE device 114 in that it enables UE device 114 to communicate with WAN 106 independently of LAN 102. Wireless communication node 104 includes, for example, a cellular wireless base station (e.g., a macro cell, a small cell, a micro cell, a femto cell, etc.), such as depicted in FIG. 1. However, wireless communication node 104 could also include a wireless communication satellite, such as a VLEO satellite, a LEO satellite, a MEO satellite, or a GEO satellite. Additionally, wireless communication node 104 could include a free space optical communication device. Furthermore, wireless communication node 104 could include a Wi-Fi access point or a LoRa access point. Wireless communication node 104 is communicatively coupled to WAN 106 via a logical communication link 136 which includes, for example, one or more of a core wireless communication network, a radio access network, a satellite ground station, and one or more X-haul communication links (e.g., a back-haul communication link, a mid-haul communication, a front-haul communication link, etc.). In some embodiments, wireless communication link 134 is a cellular wireless communication link (e.g., a cellular wireless communication link operating according to a 3GPP standard, including but not limited to an LTE cellular wireless communication link, a 5G cellular wireless communication link, and/or a 6G cellular wireless communication link), a satellite wireless communication link, a Wi-Fi wireless communication link, a LoRaWAN wireless communication link, or a free space optical wireless communication link.

Redundancy module 124 and UE device 114 are configured to cooperatively establish a backup WAN communication link to serve LAN 102 in case of a problem with primary WAN communication link 118, in response to redundancy module 124 receiving a notification message 132, which indicates a problem with primary WAN communication link 118. The backup WAN communication link serves LAN 102 in a manner analogous to how primary communication link 118 serves LAN 102, i.e., the backup WAN communication link carries data between LAN 102 and WAN 106. Examples of a problem with primary communication link 118 include, but are not limited to, failure of primary WAN communication link 118, degradation of primary WAN communication link 118 (e.g., high latency or low throughput), or a power failure affecting infrastructure supporting primary WAN communication link 118. As such, redundancy module 124 and UE device 114 collectively form one embodiment of the new systems automatic redundant connections. Redundancy module 124 responds to receipt of notification message 132 by cooperating with UE device 114 to automatically form a backup WAN communication link to serve LAN 102, using UE device 114's WAN communication link. In particular, UE 114 switches from being a client of LAN 102 to a termination device which interfaces UE 114's WAN communication link with LAN 102. Consequently, LAN communication link 130, wireless communication link 134, and logical communication link 136 collectively form a backup WAN communication link serving LAN 102. Hub 108 routes data between clients of LAN 102 and UE device 114, instead of between clients of LAN 102 and termination device 116, in the event that redundancy module 124 receives notification message 132. Accordingly, redundancy module 124 and UE device 114 collectively help maintain seamless connectivity between LAN 102 and WAN 106 in the event of a problem with primary WAN communication link 118. In certain embodiments, redundancy module 124 is configured to permit a user, or another party or system, to control which clients of LAN 102 are permitted to use the backup WAN communication link. Furthermore, in some embodiments, redundancy module 124 is configured to permit a user, or another party or system, to control what type of traffic is allowed to use the backup WAN communication link. For example, a user could configure redundancy module 124 to permit video conferencing traffic to use the backup WAN communication link while prohibiting gaming traffic from using the backup WAN communication link.

It should be appreciated that multiple clients of LAN 102 may be supported by the backup WAN communication link established using UE device 114. Additionally, a client of LAN 102 may use the backup WAN communication link even if client is not capable of directly communicating with UE device 114.

In some embodiments, notification message 132 is generated internally to hub 108. For instance, certain embodiments of hub 108 further include a detection module (not shown) configured to detect a problem with primary WAN communication link 118 and generate notification message 132 in response thereto. The detection module may detect a problem with primary WAN communication link 118, for example, based on information from termination device 116 and/or in response to WAN communication link 118 failing to transmit data.

In some other embodiments, LAN 102 receives notification message 132 from an external source via a communication link other than primary WAN communication link 118, such as via UE device 114 and its respective WAN communication link. In these embodiments, notification message 132 is considered "out-of-band" with respect to LAN 102 because it is not generated within LAN 102. For example, a power event notification system (PENS) (not shown) external to LAN 102 may detect a power failure affecting infrastructure supporting primary communication link 118, and the PENS may accordingly generate notification message 132 and send it to LAN 102 via UE device 114. As another example, infrastructure supporting primary WAN communication link 118 may detect a problem with primary WAN communication link 118, and in response therefore, the infrastructure may generate notification message 132 and send it to hub 108 via UE device 114.

Figure 2:
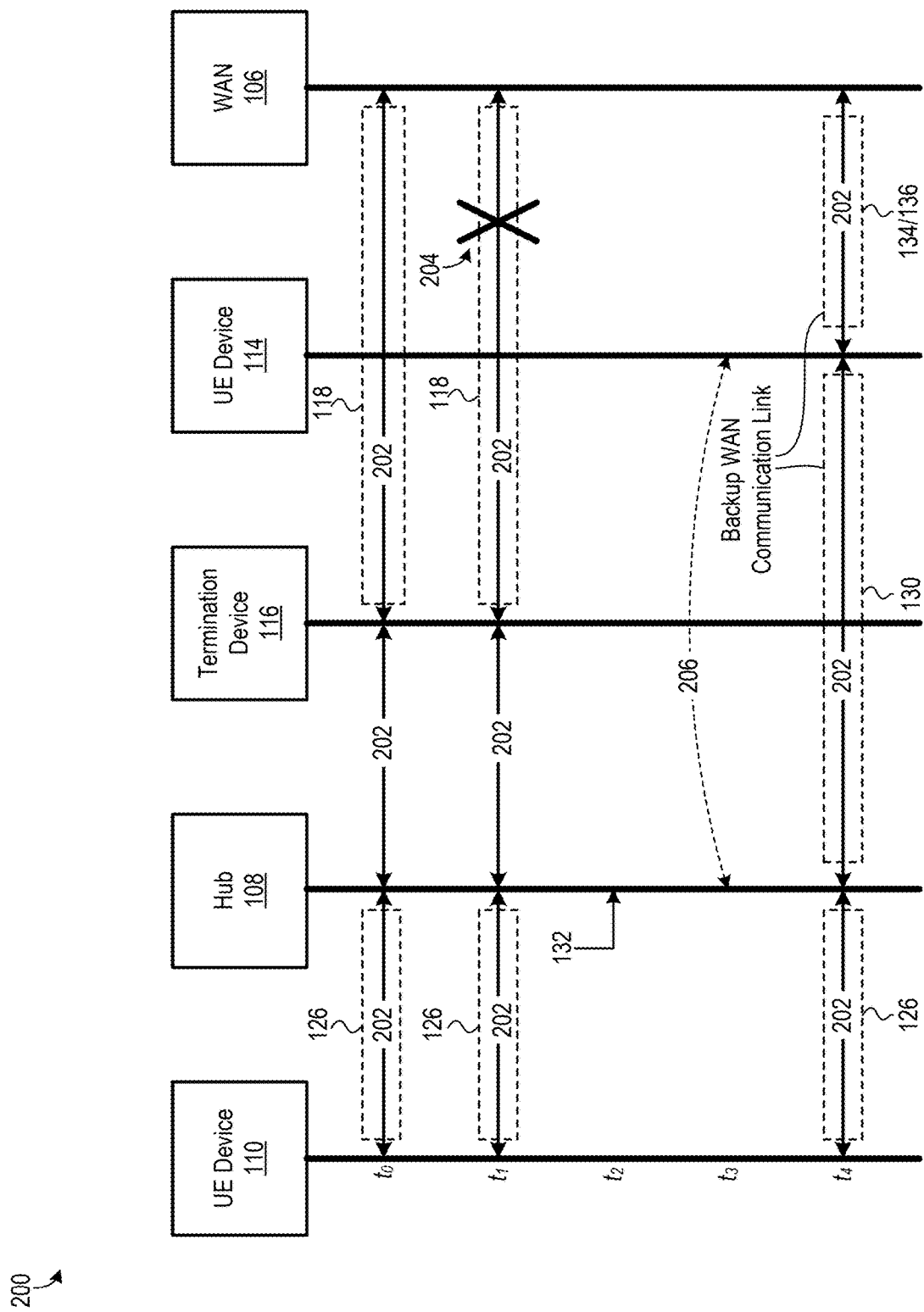
FIG. 2 is a dataflow diagram illustrating one example of operation of the FIG. 1 communication environment.

FIG. 2 is a dataflow diagram 200 illustrating one example of operation of communication environment 100. It is understood, however, that communication environment 100 is not limited to operating according to dataflow diagram 200.

Dataflow diagram 200 includes vertical lines logically representing each of UE device 110, hub 108, termination device 116, UE device 114, and WAN 106. At time $t_0$, data 202, which may be uplink or downlink data, flows between LAN 102 and WAN 106 via primary WAN communication link 118. In particular, data 202 flows (a) between UE 110 and hub 108 via LAN communication link 126, (b) between hub 108 and termination device 116, and (c) between termination device 116 and WAN 106 via primary WAN communication link 118. At time $t_1$, however, a problem occurs with primary WAN communication link 118, such that flow of data 202 between termination device 116 and WAN 106 is interrupted 204. Redundancy module 124 of hub 108 receives notification message 132 at time $t_2$ indicating occurrence of the problem with primary communication link 118. In response thereto, redundancy module 124 cooperates with UE device 114 at time $t_3$ to establish 206 a backup WAN communication link using UE device 114's WAN communication link. For example, redundancy module 124 may authenticate itself with UE device 114 and subsequently request that UE device 114 act as a termination device for its WAN communication link, such as by turning on a Wi-Fi hotspot of UE device 114 or by turning on an analogous function of UE device 114. At time $t_4$, the backup WAN communication link between LAN 102 and WAN 106 is active, where the backup communication link includes LAN communication link 130, wireless communication link 134, and logical communication link 136. Accordingly, at time $t_4$, data 202 flows (a) between UE 110 and hub 108 via LAN communication link 126, (b) between hub 108 and UE device 114 via LAN communication link 130, and (c) between UE device 114 and WAN 106 via wireless communication link 134 and logical communication link 136.

Referring again to FIG. 1, in certain embodiments, two or more of UE device 110, UE device 112, and UE device 114 are capable to providing a backup WAN communication link for LAN 102. In these embodiments, redundancy module 124 is optionally configured to (a) rank UE devices 110, 112, and 114 based on their suitability for providing a backup WAN communication link for LAN 102, and (b) select one or more of the highest ranked UE devices to provide a backup WAN communication link for LAN 102. For example, redundancy module 124 may select a highest ranked UE device to provide a single backup WAN communication link for LAN 102. As another example, redundancy module 124 may select the two highest ranked UE devices to simultaneously provide respective backup WAN communication links for LAN 102, such as to aggregate data transfer among the two backup WAN communication links. Redundancy module 124 is configured to rank UE device 110, UE device 112, UE device 114, for example, based on (a) one or more characteristics of their respective LAN communication links 126, 128, 130 (e.g., based on received signal strength, bandwidth, and/or latency of the LAN communication links), and/or (b) one or more characteristics of their respective WAN communication links (e.g., based on received signal strength, bandwidth, and/or latency of the WAN communication links).

Additionally, particular embodiments of redundancy module 124 are configured to switch which one or more UE devices provide a backup WAN communication link for serving LAN 102. For example, assume that each of UE device 112 and UE device 114 is capable of providing a backup communication WAN communication link for LAN 102. Additionally, assume that redundancy module 124 initially selects UE device 114 to provide a backup WAN communication link for LAN 102, e.g., in response to UE device 114 being ranked higher than UE device 112. Now assume that the backup WAN communication link provided by UE device 114 degrades or fails, such as due to degradation of LAN communication link 130, degradation of wireless communication link 134, and/or UE device 114 disconnecting from LAN 102, such as from a user of UE device 114 leaving a location of LAN 102. In response thereto, redundancy module 124 may automatically terminate the backup WAN communication provided by UE device 114 and establish a new backup WAN communication link using UE device 112, to mitigate, or even essentially eliminate, service interruption due to degradation or failure of the backup WAN communication link provided by UE device 114.

Furthermore, some embodiments of redundancy module 124 are configured to re-rank UE devices 110, 112, and 114 from time to time, such as periodically, based on their suitability for providing a backup WAN communication link for LAN 102. Redundancy module 124 may be configured to automatically switch which one or more UE devices provide a backup WAN communication link for LAN 102, as needed, so that the one or more UE devices that are currently highest ranked provide the backup WAN communication link for LAN 102. For example, assume that UE device 114 is initially ranked highest of the three UE devices of LAN 102, and that redundancy module 124 therefore selects UE device 114 to provide a backup WAN communication link to serve LAN 102. Now assume that redundancy module 124 re-ranks the three UE devices and that UE device 110 is currently ranked highest. Redundancy module 124 may be configured to automatically terminate the backup WAN communication link provided by UE device 112 and establish a new backup WAN communication link using UE device 110, to help ensure that the best performing UE device provides the backup WAN communication link for LAN 102 at any given time.

Moreover, particular embodiments of UE device 110, UE device 112, and UE device 114 are configured to support a plurality of WAN communication links. For example, in an alternate embodiment, UE device 114 is configured to communicate with WAN 106 via a second wireless communication link (not shown) in addition to wireless communication link 134. In such embodiments, redundancy module 124 is optionally configured to (a) rank available WAN communication links of a given UE device based on suitability for providing a backup WAN communication link for LAN 102, and (b) select one or more of the highest ranked communication links of the given UE to provide a backup WAN communication link for LAN 102. Redundancy module 124 is configured to rank available WAN communication links of a given UE, for example, based on one or more characteristics of the communication links, such as signal strength, bandwidth, and/or latency. Additionally, certain embodiments of redundancy module 124 are configured to (a) re-rank available WAN communication links of a given UE device from time to time, such as periodically, and (b) select one or more of the currently highest ranked communication links of the given UE to provide a backup WAN communication link for LAN 102.

Furthermore, particular embodiments of redundancy module 124 are configured to cooperate with terminate device 116 to transfer downlink and/or uplink data between LAN 102 and WAN 106 in advance of when the data is needed, to further help minimize service interruption resulting from degradation or failure of primary WAN communication link 118. For example, consider a scenario where (a) UE device 110 is receiving downlink data from WAN 106 and (b) the downlink data is not being generated in real time, e.g., the downlink data includes pre-recorded video data. Redundancy module 124 may be configured to cooperate with termination device 116 to (a) transfer the downlink data to LAN 102 in advance of when it is needed by UE device 110 (b) store the data in LAN 102 as buffer of data for future use by UE device 110, such as in an optional data store (not shown) of LAN 102 and/or in UE device 110 itself. Consequently, degradation or failure of primary WAN communication link 118 will not immediately affect UE device 110 because the buffer of downlink data in LAN 102 is available for use by UE device 110. Such buffer of downlink data may prevent interruption of service to UE device 110 even if there is delay in redundancy module 124 establishing a backup WAN communication link for LAN 102. An analogous buffer of uplink data could be established in WAN 106 to help minimize service disruption in uplink data transfer in case of degradation or failure of primary WAN communication link 118.

Discussed below with respect to FIGS. 3-29 are several example embodiments of communication environment 100. It is understood, however, that communication environment 100 is not limited to these examples.

Figure 3:
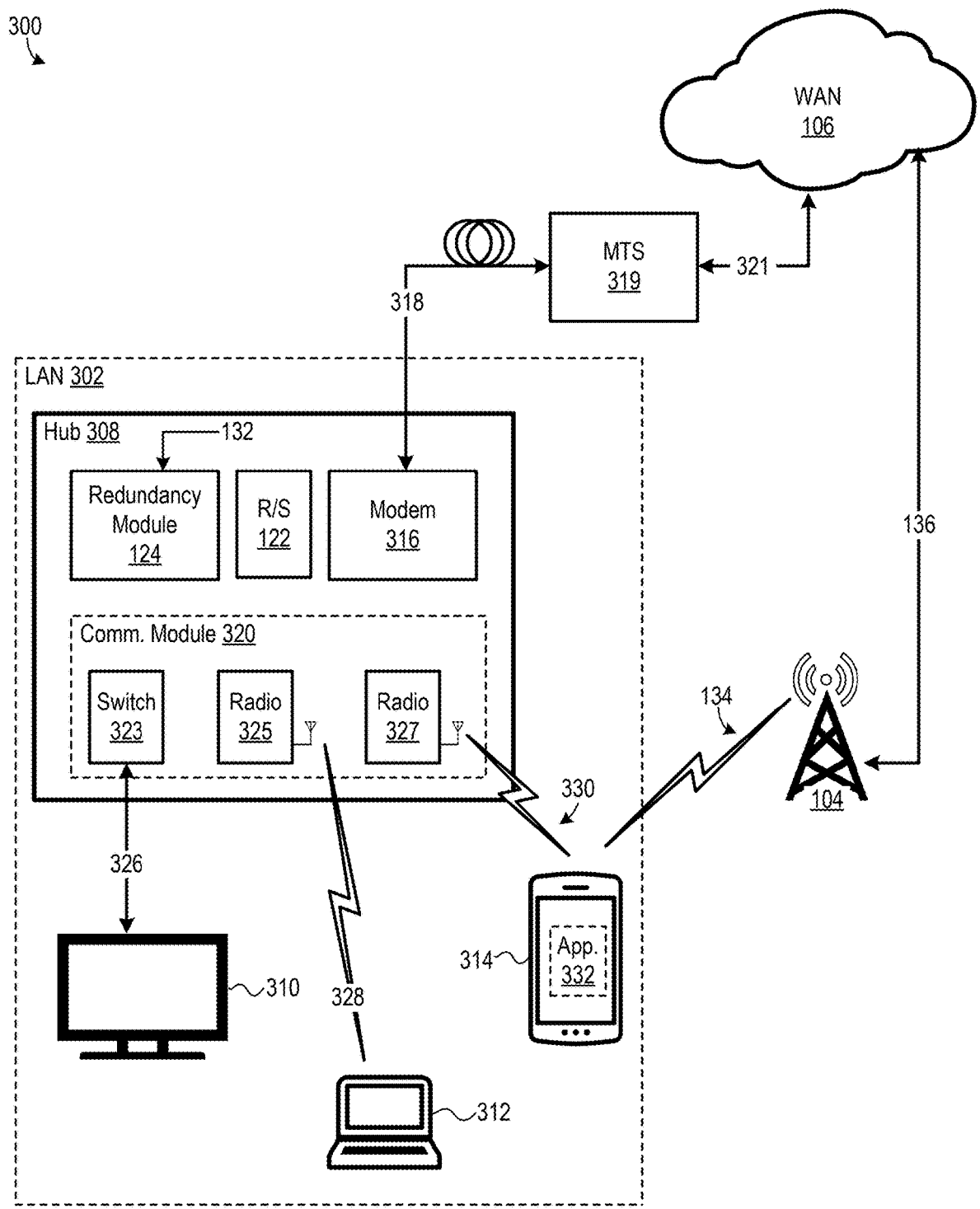
FIG. 3 is a block diagram of an embodiment of the FIG. 1 communication environment including a wireline primary wide area network (WAN) communication link.

FIG. 3 is a block diagram of a communication environment 300, which is an embodiment of communication environment 100 (FIG. 1), where (a) LAN 102 is embodied by a LAN 302 and (b) primary WAN communication link 108 is implemented by the combination of a wireline communication link 318, a modem termination system (MTS) 319, and backhaul logical communication link 321. In some embodiments, wireline communication link 318 is a cable wireline communication link (e.g., a hybrid coaxial electrical cable and optical fiber communication link, such as operating according to a Data Over Cable Service Interface Specification (DOCSIS) standard), and MTS 319 is a cable modem termination system. In some other embodiments, wireline communication link 318 is a DSL wireline communication link (e.g., a twisted pair electrical cable communication link), and MTS 319 is a digital subscriber line access multiplexer (DSLAM).

LAN 302 includes a hub 308, a television 310, a computer 312, and a mobile phone 314, which are embodiments of hub 108, UE device 110, UE device 112, and UE device 114, respectively. Hub 308 includes a modem 316, where modem 316 is embodiment of termination device 116 of FIG. 1. As such, hub 308 may be considered a network gateway. In some alternate embodiments, modem 316 is separate from hub 308. Hub 308 additionally includes a communication module 320, which is an embodiment of communication module 120 of FIG. 1. Communication module 320 includes an Ethernet switch 323, a first radio 325, and a second radio 327. In some embodiments, first radio 325 and second radio 327 operate in different frequency bands (e.g., 900 MHZ, 2.4 GHZ, 5 GHZ, 6 GHZ, or 60 GHZ), and/or first radio 325 and second radio 327 operate according to different wireless communication protocols (e.g., Wi-Fi, Bluetooth, Zigbee, Z-Wave, Wi-Fi direct, or LoRa). Television 310, computer 312, and mobile phone 314 are communicatively coupled to Ethernet switch 323, first radio 325, and second radio 327 via a LAN communication link 326, a LAN communication link 328, and a LAN communication link 330, respectively. LAN communication link 326, which is an embodiment of LAN communication link 126 of FIG. 1, is an electrical cable communication link (e.g., including an Ethernet cable, a USB cable, a coaxial cable, a telephone cable, etc.). LAN communication link 328, which is an embodiment of LAN communication link 128 of FIG. 1, is a wireless communication link. LAN communication link 330, which is an embodiment of LAN communication link 130 of FIG. 1, is also a wireless communication link. In some alternate embodiments, each of computer 312 and mobile phone 314 is a served by a common radio of communication module 320, instead of by separate radios. Additionally, in an alternate embodiment, television 310 is communicatively coupled to a radio of communication module 320, e.g., to first radio 325 and/or to second radio 327, instead of being communicatively coupled to Ethernet switch 323.

Redundancy module 124 and mobile phone 314 are configured to cooperatively establish a backup WAN communication link to serve LAN 302 in case of a problem with the primary WAN communication link serving LAN 302. In particular, if redundancy module 124 receives notification message 132 indicating a problem with the primary WAN communication link, redundancy module 124 and mobile phone 314 cooperate to automatically establish a backup WAN communication link to serve LAN 302, using mobile phone 314's WAN communication link. Specifically, redundancy module 124 sends a request to an application 332 of mobile phone 314 to cause mobile phone 314 to switch from being a client of LAN 302 to being a termination device interfacing LAN 302 with the WAN of mobile phone 314. Consequently, LAN communication link 330, wireless communication link 134, and logical communication link 136 collectively form a backup WAN communication link serving LAN 302 by transmitting data between LAN 302 and WAN 106. Hub 308 routes data between clients of LAN 302 and mobile phone 314, instead of between clients of LAN 302 and modem 316, in the event that redundancy module 124 receives notification message 132.

In some embodiments, application 332 causes mobile phone 314 to serve as a termination device for its WAN communication link by turning on a Wi-Fi hotspot of mobile phone 314, or an analogous function of mobile phone 314 using a different wireless communication protocol (e.g., a Bluetooth wireless communication protocol). Application 332 may be an application installed by a user of mobile phone 314, application 332 may be installed by a MNO (Mobile Network Operator) or a MVNO (Mobile Virtual Network Operator) servicing mobile phone 314, or application 332 may be integrated with an operating system of mobile phone 314. In particular embodiments, application 332 is configured to (a) alert a user that mobile phone 314 is providing a backup WAN communication link serving LAN 302 and/or (b) provide an accounting of data used by mobile phone 314 when providing the backup WAN communication link serving LAN 302. Application 332 is optionally also configured to provide instructions to a user of mobile phone 314 to facilitate the backup WAN communication link. For example, application 332 could be configured to instruct a user to move mobile phone 314 closer to hub 308 in response to received signal strength of LAN communication link 330 being below a threshold value. As another example, application 332 could be configured to instruct a user to move mobile phone 314 to a location where wireless communication link 134 is stronger, e.g., to a location near a window, in response to received signal strength of wireless communication link 134 being below a threshold value. Application 332 may also be configured to enable a user to register mobile phone 314 with hub 308, such as discussed below with respect to FIG. 5. Additionally, application 332 may be configured to require that a user authorize mobile phone 314 to be used to support a backup WAN communication link for LAN 302.

Mobile phone 314 may disconnected from LAN 302 at various times, such as when a user of mobile phone 314 is away from a premises including LAN 302. Accordingly, particular embodiments of redundancy module 124 are configured to determine whether mobile phone 314 is connected to LAN 302, before attempting to establish a backup WAN communication link. In these embodiments, if mobile phone 314 is connected to LAN 302, redundancy module 124 and mobile phone 314 cooperate to establish a backup WAN communication link, as discussed above. If mobile phone 314 is not connected to LAN 302, however, redundancy module 124 may either not attempt to establish a backup WAN communication link, or redundancy module 124 may attempt to establish a backup WAN communication link using another UE device connected to LAN 302, depending on the implementation of redundancy module 124.

Figure 4:
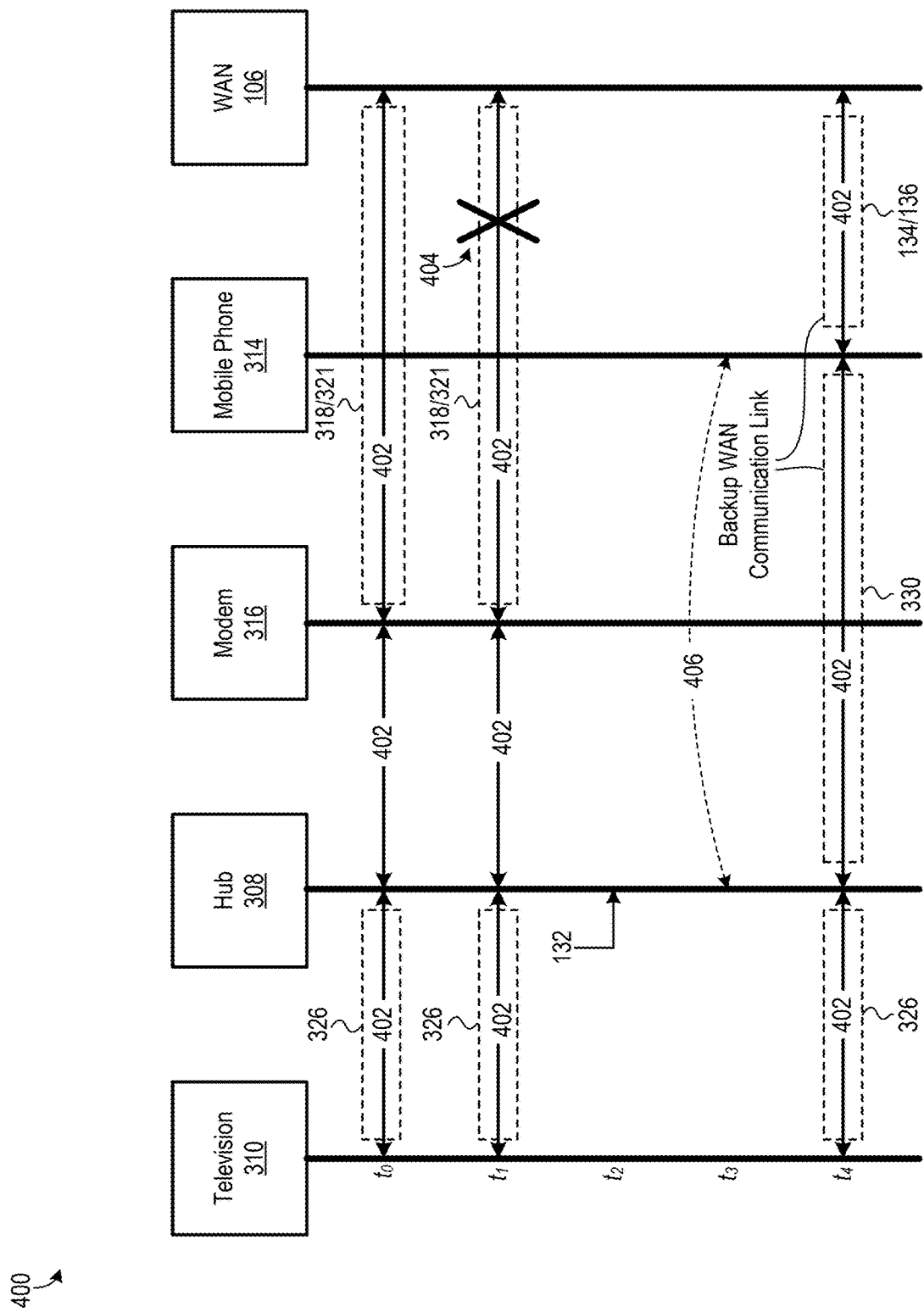
FIG. 4 is a dataflow diagram illustrating one example of operation of the FIG. 3 communication environment.

FIG. 4 is a dataflow diagram 400 illustrating one example of operation of communication environment 300. It is understood, however, that communication environment 300 is not limited to operating according to dataflow diagram 400.

Dataflow diagram 400 includes vertical lines logically representing each of television 310, hub 308, modem 316, mobile phone 314, and WAN 106. At time $t_0$, data 402, which may be uplink or downlink data, flows between LAN 302 and WAN 106 via the primary WAN communication link. In particular, data 402 flows (a) between television 310 and hub 308 via LAN communication link 326, (b) between hub 308 and modem 316, and (c) between modem 316 and WAN 106 via wireline communication link 318 and logical communication link 321. At time $t_1$, however, a problem occurs with the primary communication link, such that flow of data 402 between modem 316 and WAN 106 is interrupted 404. Redundancy module 124 of hub 308 receives notification message 132 at time $t_2$ indicating occurrence of the problem with the primary communication link. In response thereto, redundancy module 124 cooperates with mobile phone 314 at time $t_3$ to establish 406 a backup WAN communication link using mobile phone 314's WAN communication link. For example, redundancy module 124 may authenticate itself with mobile phone 314 and subsequently request that mobile phone 314 act as a termination device for its WAN communication link, such as by turning on a Wi-Fi hotspot of mobile phone 314 or by turning on an analogous function of mobile phone 314. At time $t_4$, the backup WAN communication link between LAN 302 and WAN 106 is active, where the backup communication link includes LAN communication link 330, wireless communication link 134, and logical communication link 136. Accordingly, at time $t_4$, data 402 flows (a) between television 310 and hub 308 via LAN communication link 326, (b) between hub 308 and mobile phone 314 via LAN communication link 330, and (c) between mobile phone 314 and WAN 106 via wireless communication link 134 and logical communication link 136.

Figure 5:
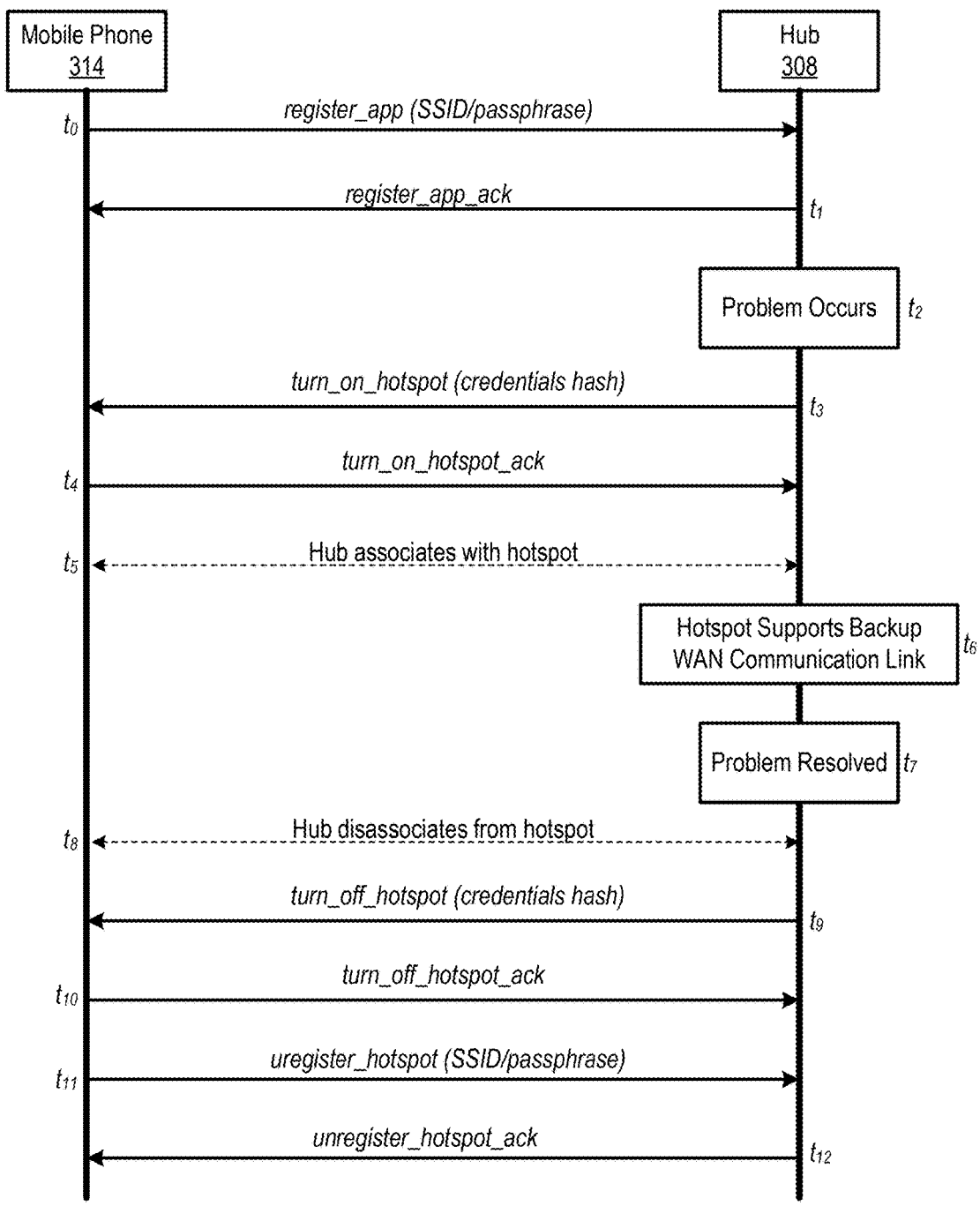
FIG. 5 is a dataflow diagram illustrating another example of operation of the FIG. 3 communication environment.

FIG. 5 is a dataflow diagram 500 illustrating another example of operation of communication environment 300. It is understood, however, that communication environment 300 is not limited to operating according to dataflow diagram 500. Additionally, the FIG. 5 example assumes that mobile phone 314 is capable of acting as a termination device for its WAN communication link by turning on a Wi-Fi hotspot of the mobile phone, to communicatively interface hub 308 with wireless communication link 134. It is understood, though, that mobile phone 314 may be capable of acting as a termination device in additional or alternative manners.

At time $t_0$, mobile phone 314 sends a register_app message to hub 308, including, for example, credentials for application 332 in the form of a Wi-Fi SSID for the application and a passphrase for the application. Hub 308 responds at time $t_1$ by sending a register_app_ack message to mobile phone 314, acknowledging that mobile phone 314 is registered with hub 308 for the purpose of providing a backup WAN communication link for LAN 302. Each of mobile phone 314 and hub 308 may also create a hash of the SSID and passphrase credentials (not shown in FIG. 5).

At time $t_2$, a problem occurs in the primary WAN communication link for LAN 302. Consequently, redundancy module 124 receives notification message 132 (generated either internal or external to hub 308), and hub 308 sends a message turn_on_hotspot to mobile phone 316 at time $t_3$. Message turn_on_hotspot requests that mobile phone 316 turn on its Wi-Fi hotspot for use by LAN 302 to support a backup WAN communication link, and the message also includes a hash of SSID and passphrase credentials to authenticate hub 308 with mobile phone 316. Mobile phone 314 responds at time $t_4$ by sending a message turn_on_hotspot_ack to hub 308 acknowledging that the mobile phone's hotspot is turned on. Hub 308 associates with the hotspot of mobile phone 314 at time $t_5$. Mobile phone 314 is now ready to serve as a termination device to communicatively interface hub 308 with wireless communication link 134, and the hotspot of mobile phone 314 accordingly supports a backup WAN communication link for LAN 302 at time $t_6$.

The problem with the primary WAN communication link is resolved at time $t_7$. Consequently, hub 308 disassociates from the hotspot of mobile phone 314 at time $t_8$. Hub 308 then sends a message turn_off_hotspot to mobile phone 314 at time $t_9$, where message turn_off_hotspot instructs mobile phone 314 to turn off its hotspot. Message also includes a hash of turn_off_hotspot. Mobile phone 314 responds at time $t_{10}$ by sending a message turn_off_hotspot_ack to hub 308, where the message acknowledges that its hotspot is turned off.

A user of mobile phone 314 subsequently elects to disassociate mobile phone 314 from hub 308, and mobile phone 314 therefore sends a message unregister_hotspot to hub 308 at time $t_{11}$, where the message includes credentials SSID and passphrase. Hub 308 responds at time $t_{12}$ by sending a message unregister_hotspot_ack to mobile phone 314, where the message acknowledges that mobile phone 314 is unregistered from hub 308.

In an alternate embodiment of dataflow diagram 500, the user does not elect to disassociate mobile phone 314 from hub 308, and the steps occurring at times $t_{11}$ and $t_{12}$ of FIG. 5 are therefore omitted. However, mobile phone 314 may nevertheless disconnect from LAN 302 from time to time, such as when the user of mobile phone 314 leaves a premises including LAN 302. In such cases, registration of mobile phone 314 with hub 308 may time out until mobile phone 314 is again connected to LAN 302, such as when the user of mobile phone 314 returns to the premises including LAN 302. Furthermore, in certain embodiments, mobile phone 314 and redundancy module 124 are configured to exchange messages from time to time, e.g., periodically, so that redundancy module 124 knows when mobile phone 134 is connected to LAN 302. Redundancy module 124 may cause registration of mobile phone 314 with hub 308 to time out if redundancy module 124 does not receive a message from mobile phone 314 within a predetermined time frame. Redundancy module 124 is optionally further configured to automatically prepare for establishing a backup WAN communication with a different UE device in the event that registration of mobile phone 314 with hub 308 times out.

Figure 6:
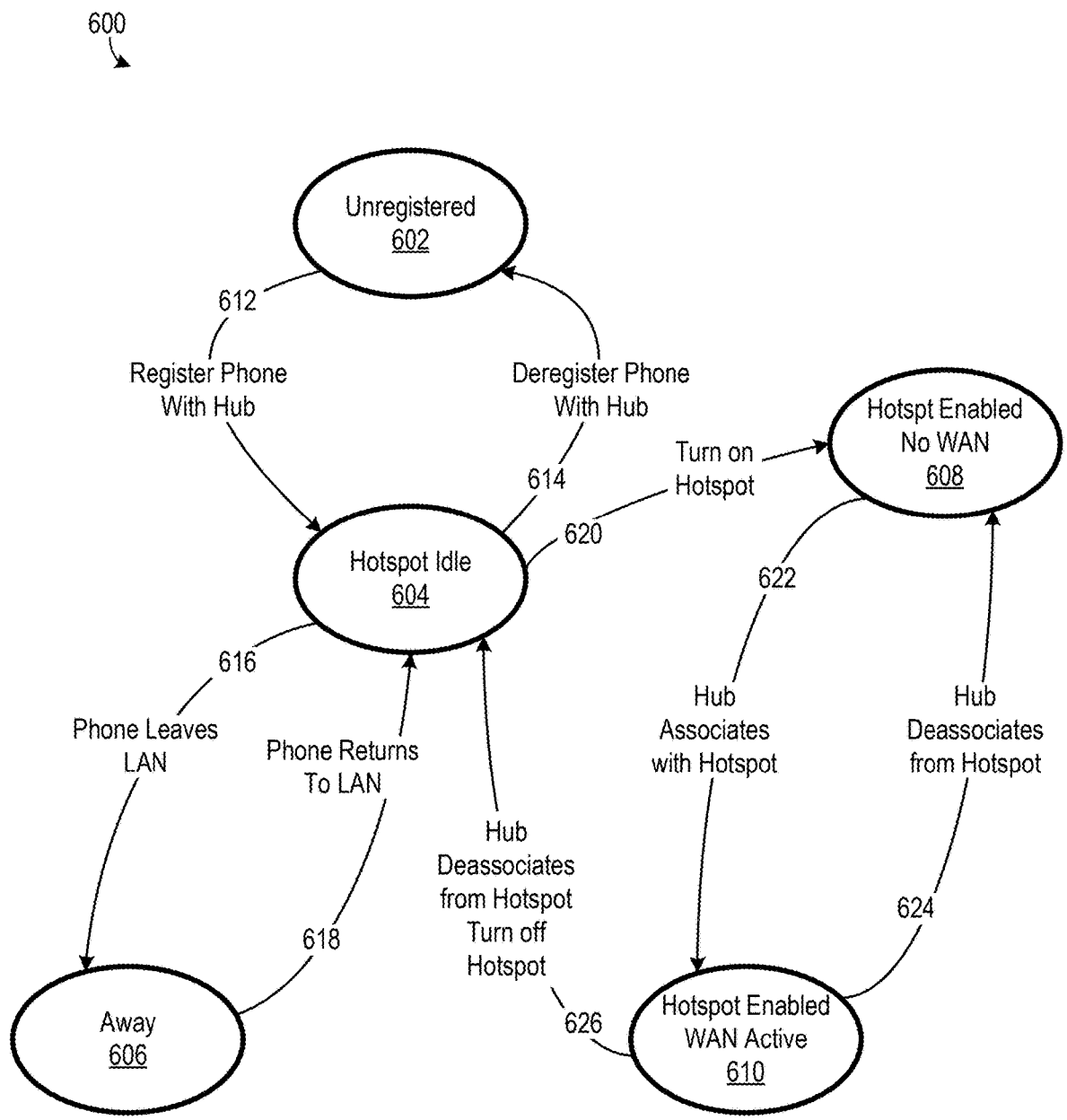
FIG. 6 is a state diagram illustrating an additional example of operation of the FIG. 3 communication environment.

FIG. 6 is a state diagram 600 illustrating an additional example of operation of communication environment 300. It is understood, however, that communication environment 300 is not limited to operating according to state diagram 600. Additionally, similar to the FIG. 5 example, the FIG. 6 example assumes that mobile phone 314 is capable of acting as a termination device for its WAN communication link by turning on a Wi-Fi hotspot of the mobile phone, to communicatively interface hub 308 with wireless communication link 134. It is understood, though, that mobile phone 314 may be capable of acting as a termination device in additional or alternative manners.

State diagram 600 includes states 602, 604, 606, 608, and 610. State 602 is unregistered state where mobile phone 314 is not registered with hub 308. State 604 is hotspot idle state where mobile phone 314 is registered with hub 308 but a Wi-Fi mobile spot of mobile phone 314 is turned off. State 606 is an away state where mobile phone 314 is away from LAN 302. State 608 is hotspot enabled but no WAN state, where the hotspot of mobile phone 314 is turned on, but the hotspot is not supporting a backup WAN communication link for LAN 302. State 610 is hotspot enabled and WAN active state, where the hotspot of mobile phone 314 is turned on and the hotspot is supporting a backup WAN communication link for LAN 302.

Communication environment 300 may transition 612 from state 602 to state 604 by registering mobile phone 314 with hub 308, and the communication environment may transition 614 from state 604 to state 602 by deregistering mobile phone 314 from hub 308. Communication environment 600 may transition 616 from state 604 to state 606 by mobile phone 314 leaving LAN 302, i.e., by mobile phone 314 disconnecting from LAN 302. Communication environment 300 may transition 618 from state 606 to state 604 by mobile phone 314 returning to LAN 302, i.e., by mobile phone 314 connecting to LAN 302.

Communication environment 300 may transition 620 from state 604 to state 608 by turning on the hotspot of mobile phone 314, and the communication environment may transition 622 from state 608 to state 610 by hub 308 associating with the hotspot of mobile phone 314. Communication environment 300 may transition 624 from state 610 to state 608 by hub 308 de-associating from the hotspot of mobile phone 314, and the communication environment may transition 626 from state 610 to state 604 by (a) hub 308 disassociating from the hotspot of mobile phone 314 and (b) turning off the hotspot of mobile phone 314.

Figure 7:
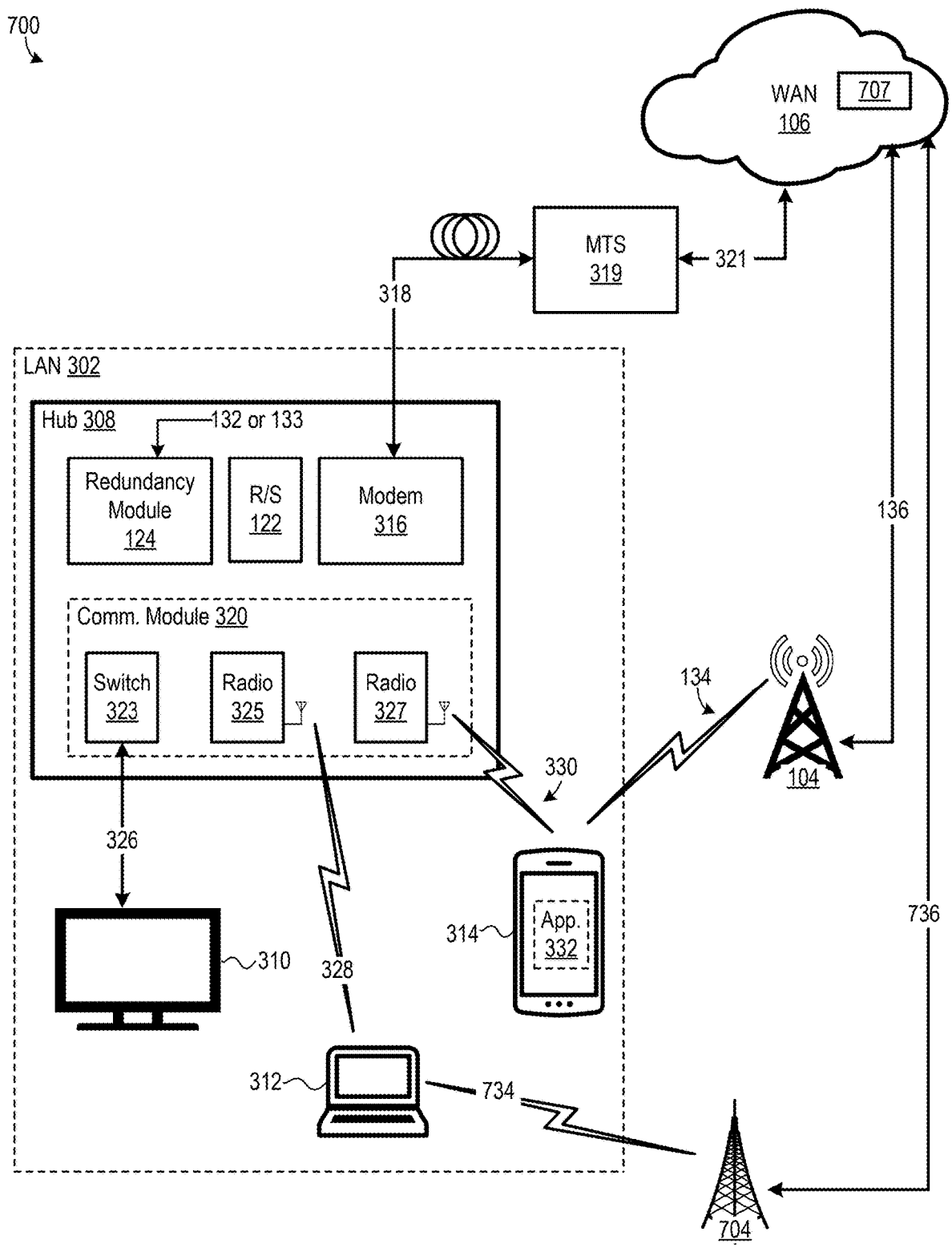
FIG. 7 is a block diagram of alternate embodiment of the FIG. 3 communication environment including an additional wireless communication node.

FIG. 7 is a block diagram of a communication environment 700, which is an alternate embodiment of communication environment 300 of FIG. 3 further including a wireless communication node 704 communicatively coupled to WAN 106 by a logical communication link 736. Wireless communication node 704 includes, for example, a cellular wireless base station (e.g., a macro cell, a small cell, a micro cell, a femto cell, etc.), such as depicted in FIG. 7. However, wireless communication node 704 could also include a wireless communication satellite or a free space optical communication device. Wireless communication nodes 104 and 704 may be operated by a common carrier or by different respective carriers. Logical communication link 736 includes, for example, one or of a core wireless communication network, a radio access network, a satellite ground station, and one or more X-haul communication links (e.g., a back-haul communication link, a mid-haul communication, a front-haul communication link, etc.).

In the FIG. 7 embodiment, computer 312 is configured to wirelessly communicate with wireless communication node 704 via a wireless communication link 734. Accordingly, computer 312 has its own WAN communication link enabling it communicate with WAN 106 independently of LAN 302. In some embodiments, wireless communication link 734 is a cellular wireless communication link (e.g., a cellular wireless communication link operating according to a 3GPP standard, including but not limited to an LTE cellular wireless communication link, a 5G cellular wireless communication link, and/or a 6G cellular wireless communication link), a satellite wireless communication link, a Wi-Fi wireless communication link, a LoRaWAN wireless communication link, or a free space optical wireless communication link.

The fact that computer 312 has its own WAN communication link enables computer 312, as well as mobile phone 314, to support a backup WAN communication link serving LAN 302. For example, redundancy module 124 may cooperate with computer 312 to establish a backup WAN communication link for LAN 302, where the backup WAN communication link includes (a) LAN communication link 328, wireless communication link 734, and logical communication link 736. In the event redundancy module 124 receives notification message 132 indicating a problem with the primary WAN communication link for LAN 302, redundancy module 132 may establish a single backup WAN communication link for LAN 302 using either mobile phone 314 or computer 312. For example, redundancy module 124 may rank mobile phone 314 and computer 312 based on suitability for providing a backup WAN communication link for LAN 302, and redundancy module 124 may select the higher ranked device to provide the backup WAN communication link. In another embodiment, communication link 328 is a wired communication link (e.g., Ethernet, MoCA, PLC, etc.).

Alternately, in the event redundancy module 124 receives notification message 132 indicating a problem with the primary WAN communication link for LAN 302, redundancy module 132 may establish a two backup WAN communication links for LAN 302, that is, redundancy module 132 may establish respective backup WAN communication links using each of mobile phone 314 and computer 312. Hub 308 may cooperate with an optional server 707 of WAN 106 to steer, split, and/or switch data between the two backup WAN communication links. Additionally, server 707 may be configured such that the two backup WAN communication links are represented by a common Internet protocol (IP) address in WAN 106.

FIGS. 8-11, discussed below, illustrate respective examples of operation of communication environment 700 of FIG. 7. It is understood, though, that wireless communication environment 700 is not limited to operating according to the examples of FIGS. 8-11.

Figure 8:
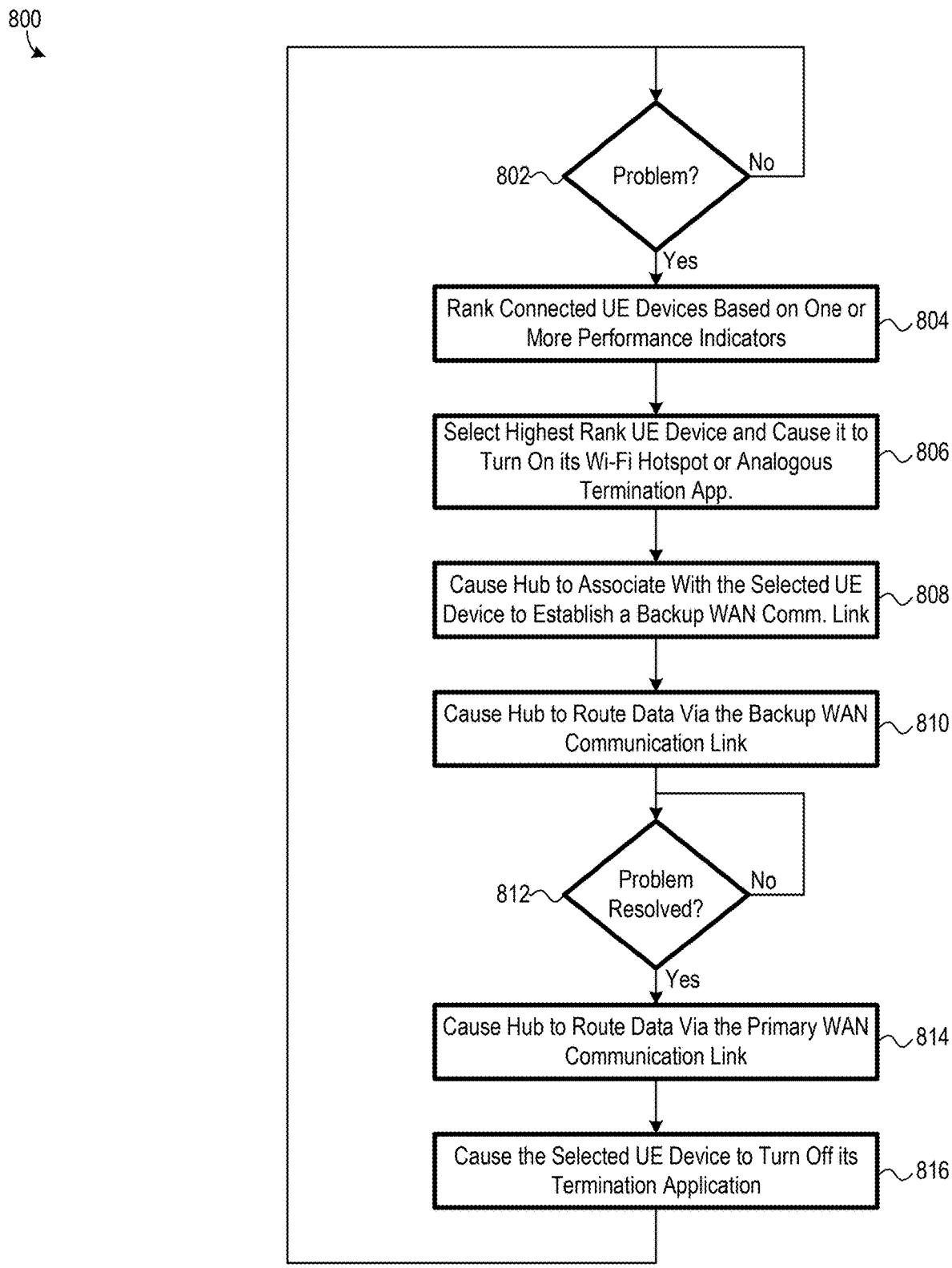
FIG. 8 is a flow chart of a method for automatic redundant connections, according to an embodiment.

FIG. 8 is a flow chart of a method 800 for automatic redundant connections, which is one embodiment of the new methods disclosed herein. In a decision block 802, redundancy module 124 determines whether there is a problem with the primary WAN communication link for LAN 302. In one example of block 802, redundancy module 124 determines that there is a problem with the primary WAN communication link in response to receiving a notification message 132 within a predetermined time frame. As another example of block 802, redundancy module 124 determines that there is not a problem with the primary WAN communication link in response to not receiving a notification message 132 within a predetermined time frame. If the result of decision block 802 is no, decision block 802 repeats, optionally after a waiting for a delay period to expire (not shown). If the result of decision block 802 is yes, method 800 proceeds to a block 804 where redundancy module 124 ranks UE devices that are connected to LAN 302 based one or more performance indicators, to rank suitability of the UE devices for supporting a backup WAN communication link for LAN 302. For example, redundancy module 124 may rank mobile phone 314 first and computer 312 second, such as based on throughput of their respective WAN communication links, received signal strength of their respective WAN communication links, latency of their respective WAN communication links, throughput of their respective LAN communication links, received signal strength of their respective LAN communication links, and/or latency of their respective LAN communication links. In particular embodiments, television 310 is not included in the ranking because it does not have its own WAN communication link.

In a block 806, redundancy module 124 selects the highest rank UE device and causes it to turn in its termination application, such as a Wi-Fi hotspot or an analogous application, which allows it to serve as a wireless access point for LAN 302. For example, redundancy module 124 may cause mobile phone 314 to turn its Wi-Fi mobile hotspot. In a block 808, redundancy module 124 causes hub 308 to associate with the selected UE device, to establish a backup WAN communication link. For example, redundancy module 124 may cause hub 308 to associate with the Wi-Fi hotspot of mobile phone 314, to establish a backup WAN communication link to serve LAN 302. In block 810, redundancy module 124 causes hub 308 to route data between LAN 302 and WAN 106 via the backup WAN communication link established in block 808. For example, redundancy module 124 may cause hub 308 to route data between LAN 302 and WAN 106 via a backup WAN communication link including LAN communication link 330, wireless communication link 134, and logical communication link 136.

In a decision block 812, redundancy module 124 determines whether the problem with the primary WAN communication link has been resolved. Although FIG. 8 depicts decision block 812 as being performed after block 810, decision block 812 could be also be performed concurrently with block 810. In one example of decision block 812, redundancy module 124 determines that the problem with the primary WAN communication link has been resolved in response to redundancy module 124 receiving a second notification message 133 (see FIG. 7) indicating that the problem has been resolved. If the result of decision block 812 is no, decision block 812 repeats, optionally after a waiting for a delay period to expire (not shown). If the result of decision block 812 is yes, method 800 proceeds to a block 814 where redundancy module 124 causes hub 308 to route data between LAN 302 and WAN 106 using the primary WAN communication link, instead of using the backup WAN communication link established in block 808. In a block 816, redundancy module 124 causes the selected UE device to turn off its termination application. In one example of block 816, redundancy module 124 causes mobile phone 314 to turn off its Wi-Fi hotspot.

Figure 9:
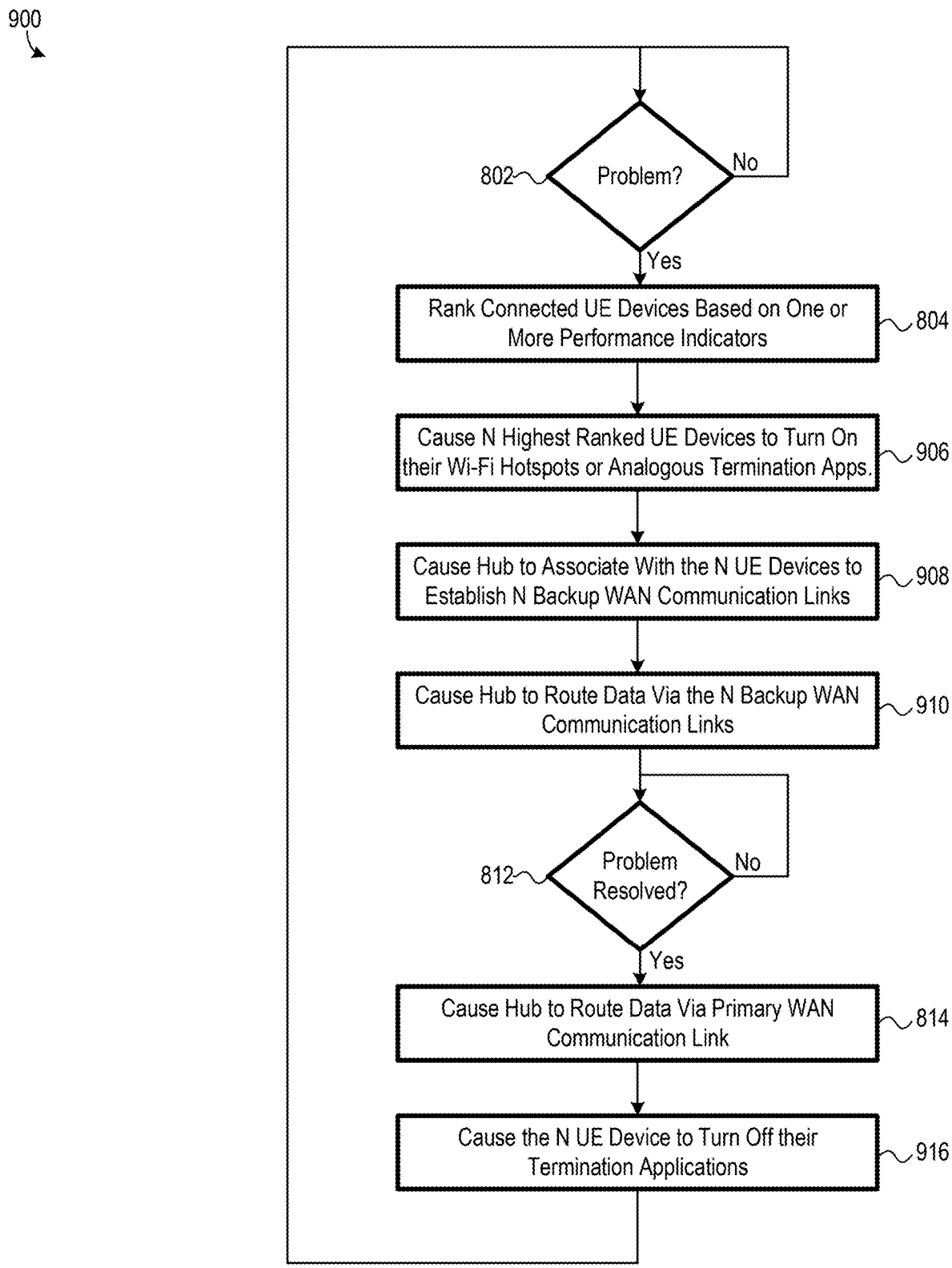
FIG. 9 is a flow chart of an alternate embodiment of the FIG. 8 method.

FIG. 9 is a flow chart of a method 900 for automatic redundant connections, which is an alternate embodiment of method 800 of FIG. 8. Method 900 includes blocks 906, 908, 910 and 916 in place of blocks 806, 808, 810, and 816, respectively. In block 906, redundancy module 124 causes the N highest rank UE devices to turn in their respective termination applications, where N is a positive integer greater than one. For example, redundancy module 124 may cause each of mobile phone 314 and computer 312 to turn its respective Wi-Fi mobile hotspot. In block 908, redundancy module 124 causes hub 308 to associate with each of the N highest ranked UE devices, to establish N backup WAN communication links. For example, redundancy module 124 may cause hub 308 to associate with the respective Wi-Fi hotspot of each of mobile phone 314 and computer 312, to establish two backup WAN communication links to serve LAN 302. In block 910, redundancy module 124 causes hub 308 to route data between LAN 302 and WAN 106 via the N backup WAN communication links established in block 908. For example, redundancy module 124 may cause hub 308 to steer, split, or switch data between LAN 302 and WAN 106 via the two backup WAN communication links established in block 908. In block 916, redundancy module 124 causes the N highest ranked UE devices to turn off their respective termination applications. In one example of block 916, redundancy module 124 causes each of mobile phone 314 and computer 312 to turn off its respective Wi-Fi hotspot.

Figure 10:
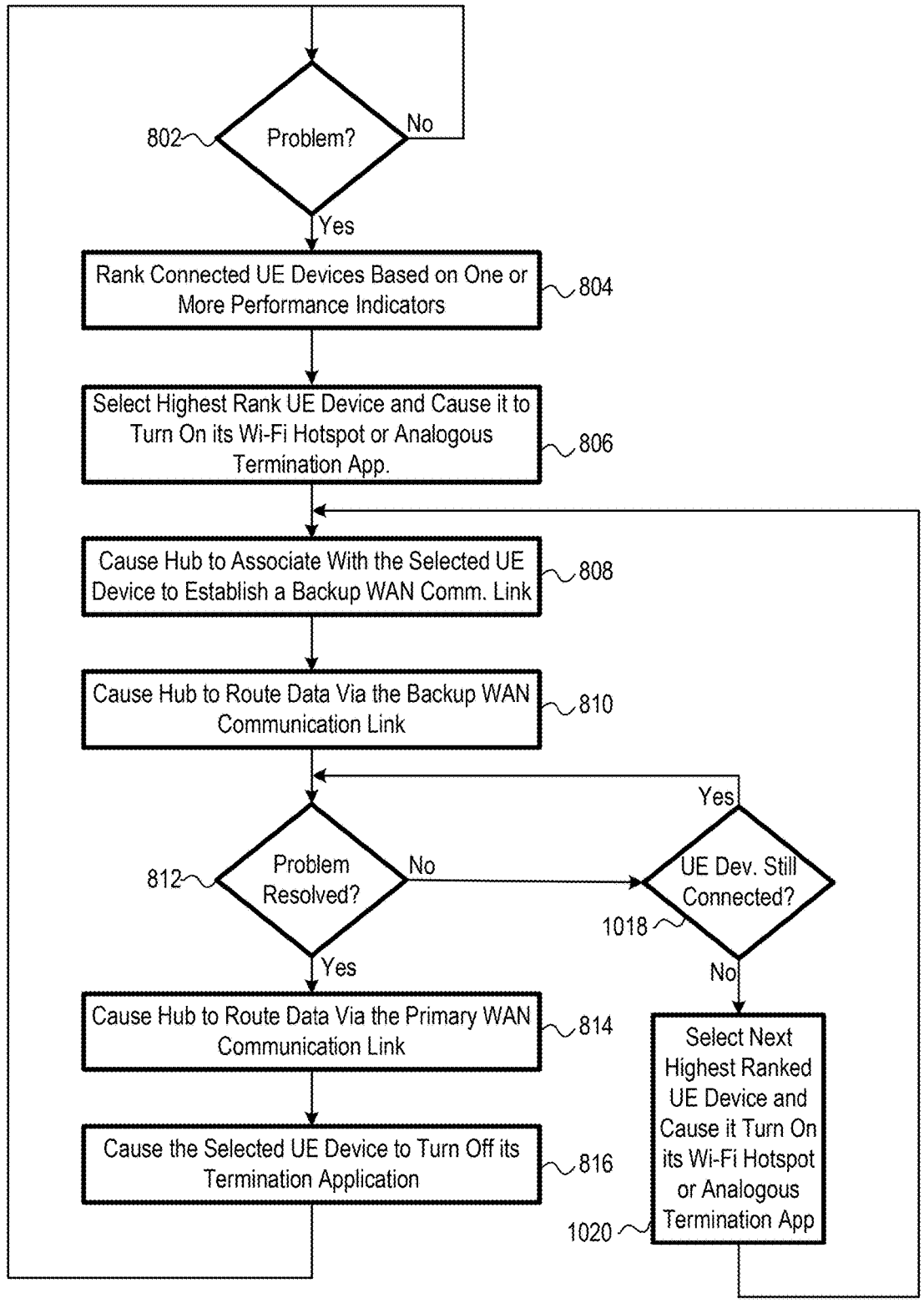
FIG. 10 is a flow chart of another alternate embodiment of the FIG. 8 method.

FIG. 10 is a flow chart of a method 1000 for automatic redundant connections, which is another alternate embodiment of method 800 of FIG. 8. Method 1000 includes a decision block 1018 and a block 1020 in addition to the blocks of method 800. If the result of decision block 812 is no in method 1000, the method proceeds to a decision block 1018 where redundancy module 124 determines whether the selected UE device is still connected to LAN 302. If the result of decision block 1018 is yes, method 1000 returns to decision block 812, optionally after a waiting for a delay period to expire (not shown). If the result of decision block 1018 is no, method 1000 proceeds to block 1020 where redundancy module 124 selects the next highest rank UE device and causes it to turn in its termination application, such as a Wi-Fi hotspot or an analogous application, which allows the selected UE device to serve as a wireless access point for LAN 302. For example, if mobile phone 314 was ranked first and computer 312 was ranked second, redundancy module 124 may select computer 312 and cause it to turn its Wi-Fi mobile hotspot or analogous application, in block 1020. Method 1000 subsequently returns to block 808 from block 1020.

Figure 11:
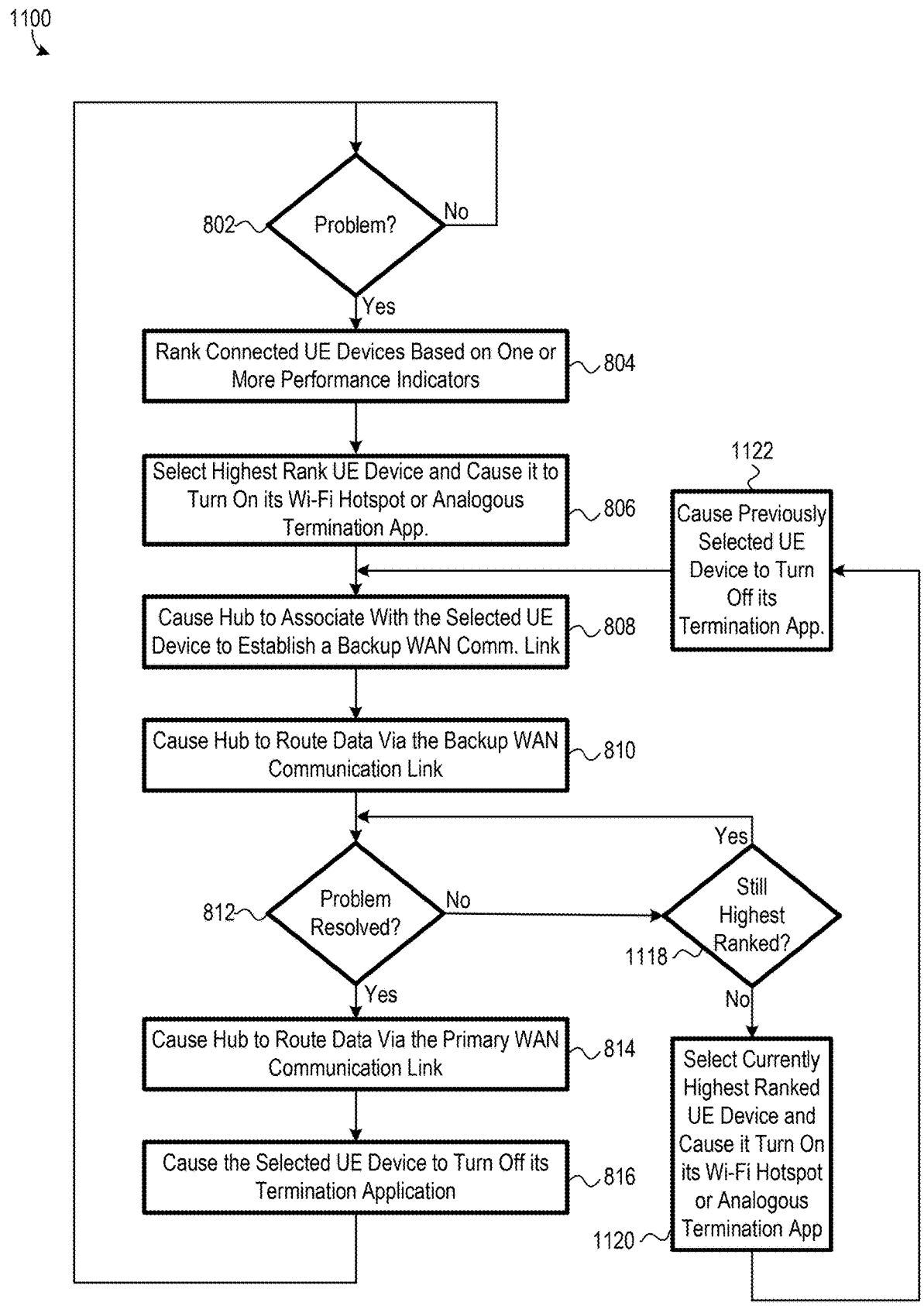
FIG. 11 is a flow chart of another alternate embodiment of the FIG. 8 method.

FIG. 11 is a flow chart of a method 1100 for automatic redundant connections, which is another alternate embodiment of method 800 of FIG. 8. Method 1100 includes a decision block 1118, a block 1120, and a block 1122 in addition to the blocks of method 800. If the result of decision block 812 is no in method 1100, the method proceeds to a decision block 1118 where redundancy module 124 determines whether the selected UE device is still the highest ranked UE device. For example, if mobile phone 314 was previously selected in block 806 because it was the highest ranked UE device, redundancy module 124 determines whether mobile phone 314 is still the highest ranked UE device. If the result of decision block 1118 is yes, method 1100 returns to decision block 812, optionally after a waiting for a delay period to expire (not shown). If the result of decision block 1118 is no, method 1100 proceeds to block 1120 where redundancy module 124 selects the currently highest rank UE device and causes it to turn in its termination application, such as a Wi-Fi hotspot or an analogous application, which allows the selected UE device to serve as a wireless access point for LAN 302. For example, if mobile phone 314 was previously ranked first and computer 312 is instead now ranked first, redundancy module 124 may select computer 312 and cause it to turn its Wi-Fi mobile hotspot or analogous application, in block 1120. Method 1100 proceeds from block 1120 to block 1122 where redundancy module 1124 causes the previously selected termination device to turn off its termination application. For example, if mobile phone 314 was previously ranked first but is no longer ranked first (and therefore is no longer the "selected" UE device), redundancy module 124 causes mobile phone 314 to turn off its Wi-Fi hotspot, in block 1122. Method 1100 subsequently returns to block 808 from block 1122.

Figure 12:
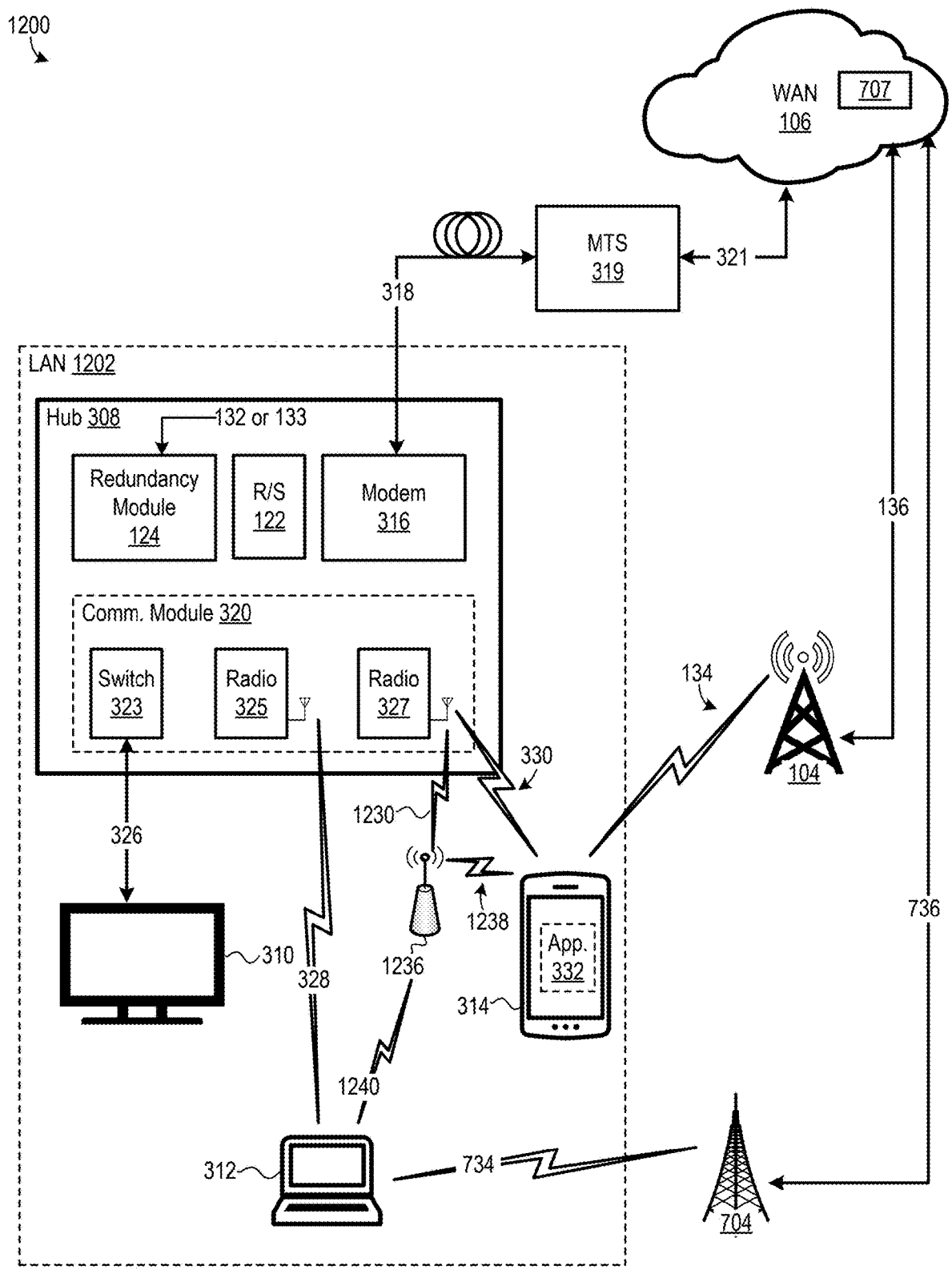
FIG. 12 is a block diagram of an alternate embodiment of the FIG. 7 communication environment further including a wireless access point separate from a hub of the communication environment.

FIG. 12 is a block diagram of a communication environment 1200, which is an alternate embodiment of communication environment 700 (FIG. 7) with LAN 302 replaced with LAN 1202. LAN 1202 is like LAN 302 except that LAN 1202 further includes a wireless access point 1236 communicatively coupled to hub 308 via a LAN communication link 1230. LAN communication link 1230 is a wireless communication link, and in some embodiments, LAN communication link 1230 is a Wi-Fi wireless communication link. Wireless access point 1236 is, for example, a range extender or a node in mesh wireless network of LAN 1202. Mobile phone 314 is sufficiently close to each of hub 308 and wireless access point 1236 such that mobile phone 314 could either (a) directly connect to hub 308 via LAN communication link 330 or (b) connect to hub 308 via a (1) a LAN communication link 1238 between mobile phone 314 and wireless access point 1236 and (2) LAN communication link 1230 between wireless access point 1236 and hub 308. LAN communication link 1238 is, for example, a Wi-Fi wireless communication link.

In view of there being two possible paths for data between mobile phone 314 and hub 308, redundancy module 124 could establish a backup WAN communication link using mobile phone 314 via two possible paths. The first possible path includes LAN communication link 330, wireless communication link 134, and logical communication link 136, and the second possible path includes LAN communication link 1230, LAN communication link 1238, wireless communication link 134, and logical communication link 136. Particular embodiments of redundancy module 124 are configured to select one of the two paths based on respective performance characteristics of the two paths, such as throughput, received signal strength, current airtime utilization, retry percentage, and/or latency. For example, redundancy module 124 may select a path having a highest throughput, a highest received signal strength, and/or a lowest latency.

LAN 1202 could be configured so that all data flowing between clients of LAN 1202 and WAN 106 flows through hub 308 when using a backup WAN communication link supported by wireless access point 1236 and mobile phone 314. Alternately, LAN 1202 could be configured so that at least some data flowing between clients of LAN 1202 and WAN 106 bypasses hub 308 when using a backup WAN communication link supported by wireless access point 1236 and mobile phone 314. For example, computer 312 could potentially directly connect to wireless access point 1236 via a LAN communication link 1240 so that data flowing between computer 312 and WAN 106 via a backup WAN communication link bypasses hub 308, such as discussed below with respect to FIG. 15. Whereas data from computer 312 destined for TV 310 would flow through hub 308, and not out to WAN 106. LAN communication link 1240 is a wireless communication link, and in some embodiment, LAN communication link 1240 is Wi-Fi wireless communication link. In another embodiment, LAN communication link 1240 is a wired communication link (e.g., Ethernet, MoCA, PLC, etc.).

Figure 13:
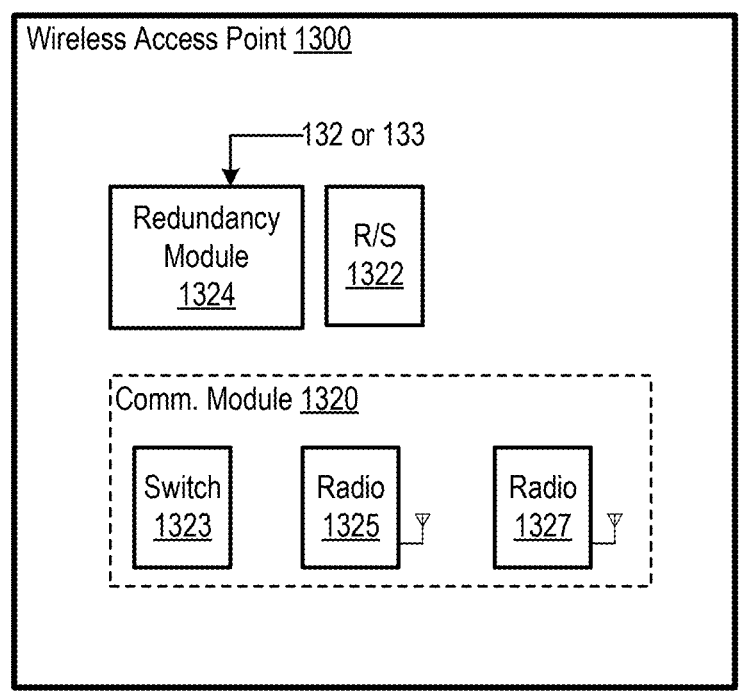
FIG. 13 is a block diagram of one embodiment of a wireless access point of the FIG. 12 communication environment.

Accordingly, certain embodiments of wireless access point 1236 includes modules similar to those of hub 308 to enable wireless access point 1236 to route data within LAN 1202 and between LAN 1202 and WAN 106, as well as to establish a backup WAN communication link using a UE device connected to LAN 1202. For example, FIG. 13 is a block diagram of a wireless access point 1300, which is one possible embodiment of wireless access point 1236 including the aforementioned modules. In particular, wireless access point 1300 includes a communication module 1320, a R/S module 1322, and a redundancy module 1324. Although the modules of wireless access point 1300 are depicted as being separate elements, two or more of these modules may be partially or fully combined. For example, in certain embodiment, two or more of communication module 1320, R/S module 1322, and redundancy module 1324 are at least partially implemented by common hardware, common software, and/or common firmware.

Communication module 1320 is analogous to communication module 320 of hub 308, and communication module 1320 is accordingly configured to communicatively interface nodes of LAN 1202 with wireless access point 1300. For example, communication module 1320 may be configured to (a) communicatively interface radio 327 of hub 308 with wireless access point 1300, (b) communicatively interface mobile phone 314 with wireless access point 1300, and (c) communicatively interface computer 312 with wireless access point 1300. Communication module 1320 is illustrated as including an Ethernet switch 1323, a first radio 1325, and a second radio 1327, which are analogous to Ethernet switch 323, first radio 325, and second radio 327, respectively. However, the quantity and type of communication elements of communication module 1320 may vary without departing from the scope hereof. For example, Ethernet switch 1323 is omitted in an alternate embodiment of wireless access point 1300. As another example, certain alternate embodiments of wireless access point include a third radio (not shown) in communication module 1320, in addition to first radio 1325 and second radio 1327.

R/S module 1322 is analogous to R/S module 122, and R/S module 1322 is accordingly configured to route data between clients of LAN 1202, as well as to route data between clients of LAN 1202 and a UE device serving as a termination device of a backup WAN communication link (e.g., mobile phone 314). Redundancy module 1324 is analogous to redundancy module 124, and redundancy module 1324 is accordingly configured to cooperatively establish a backup WAN communication link to serve LAN 1202 in case of a problem with the primary WAN communication link for LAN 1202, in response to redundancy module 1324 receiving a notification message 132. For example, redundancy module 1324 may be configured to cooperate with mobile phone 314 to automatically form a backup WAN communication link to serve LAN 1202 using mobile phone 314's WAN communication link, in a manner similar to how redundancy module 124 establishes a backup WAN communication link using mobile phone 314. Similar to a discussed above with respect to hub 108 of FIG. 1, notification message 132 could be generated internal to wireless access point 1300, or notification message 132 could be generated external to wireless access point 1300. For example, notification message 132 could be generated out-of-band with respect to LAN 1202 in a manner similar to how notification message 132 could be generated out-of-band with respect to LAN 102 of FIG. 1.

Figure 14:
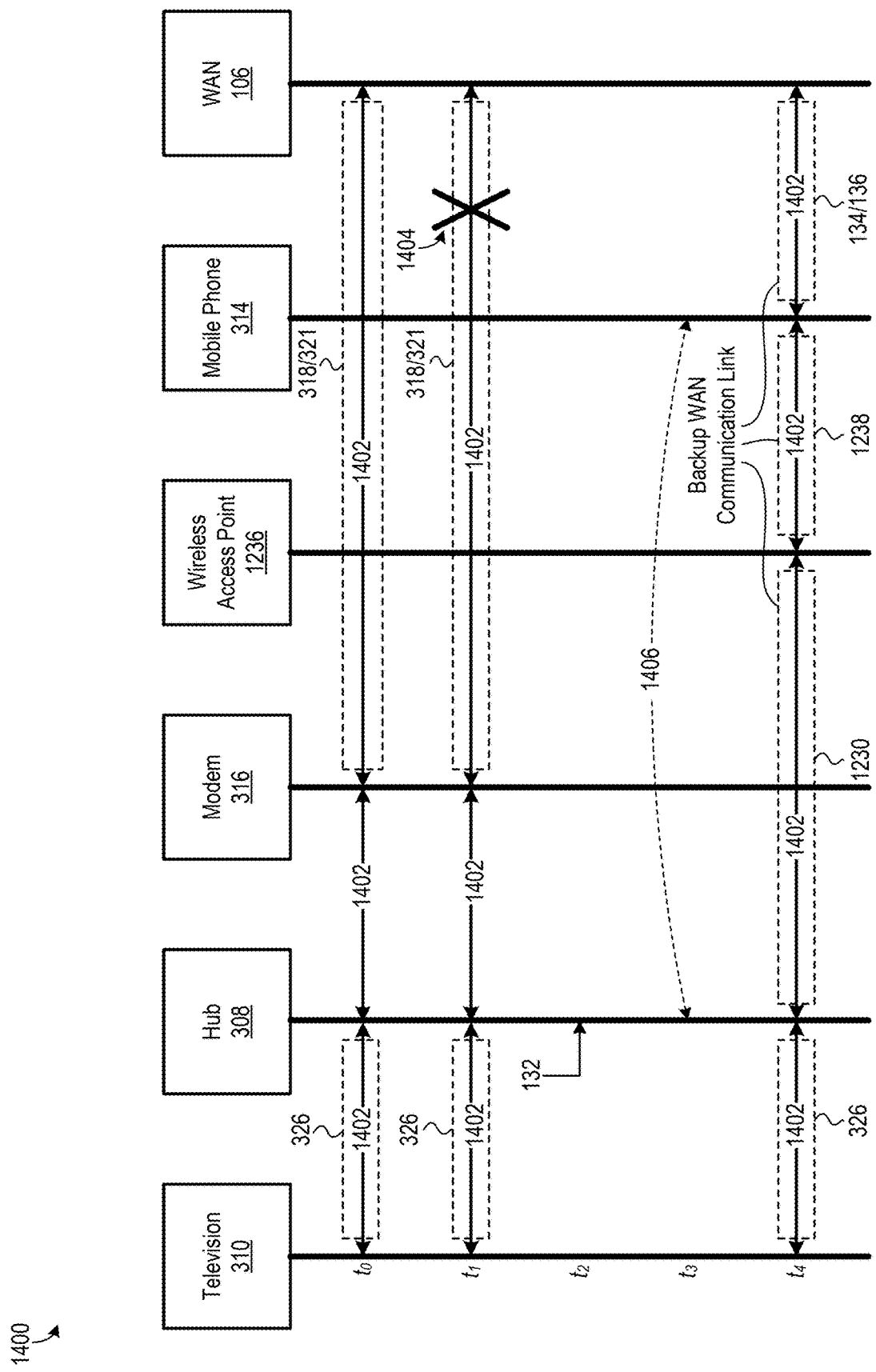
FIG. 14 is a dataflow diagram illustrating one example of operation of the FIG. 12 communication environment.

FIG. 14 is a dataflow diagram 1400 illustrating one example of operation of communication environment 1200. It is understood, however, that communication environment 1200 is not limited to operating according to dataflow diagram 1200.

Dataflow diagram 1400 includes vertical lines logically representing each of television 310, hub 308, modem 316, wireless access point 1236, mobile phone 314, and WAN 106. At time $t_0$, data 1402, which may be uplink or downlink data, flows between LAN 1202 and WAN 106 via the primary WAN communication link. In particular, data 1402 flows (a) between television 310 and hub 308 via LAN communication link 326, (b) between hub 308 and modem 316, and (c) between modem 316 and WAN 106 via wireline communication link 318 and logical communication link 321. At time $t_1$, however, a problem occurs with the primary communication link, such that flow of data 1402 between modem 316 and WAN 106 is interrupted 1404. Redundancy module 124 of hub 308 receives notification message 132 at time $t_2$ indicating occurrence of the problem with the primary communication link. In response thereto, redundancy module 124 cooperates with mobile phone 314 at time $t_3$ to establish 1406 a backup WAN communication link via wireless access point 1236 using mobile phone 314's WAN communication link. For example, redundancy module 124 may authenticate itself with mobile phone 314 and subsequently request that mobile phone 314 act as a termination device for its WAN communication link, such as by turning on a Wi-Fi hotspot of mobile phone 314 or by turning on an analogous function of mobile phone 314. At time $t_4$, the backup WAN communication link between LAN 1202 and WAN 106 is active, where the backup communication link includes LAN communication link 1230, LAN communication link 1238, wireless communication link 134, and logical communication link 136. Accordingly, at time $t_4$, data 1402 flows (a) between television 110 and hub 308 via LAN communication link 326, (b) between hub 308 and wireless access point 1236 via LAN communication link 1230, (c) between wireless access point 1236 and mobile phone 314 via LAN communication link 1238, and (d) between mobile phone 314 and WAN 106 via wireless communication link 134 and logical communication link 136.

Figure 15:
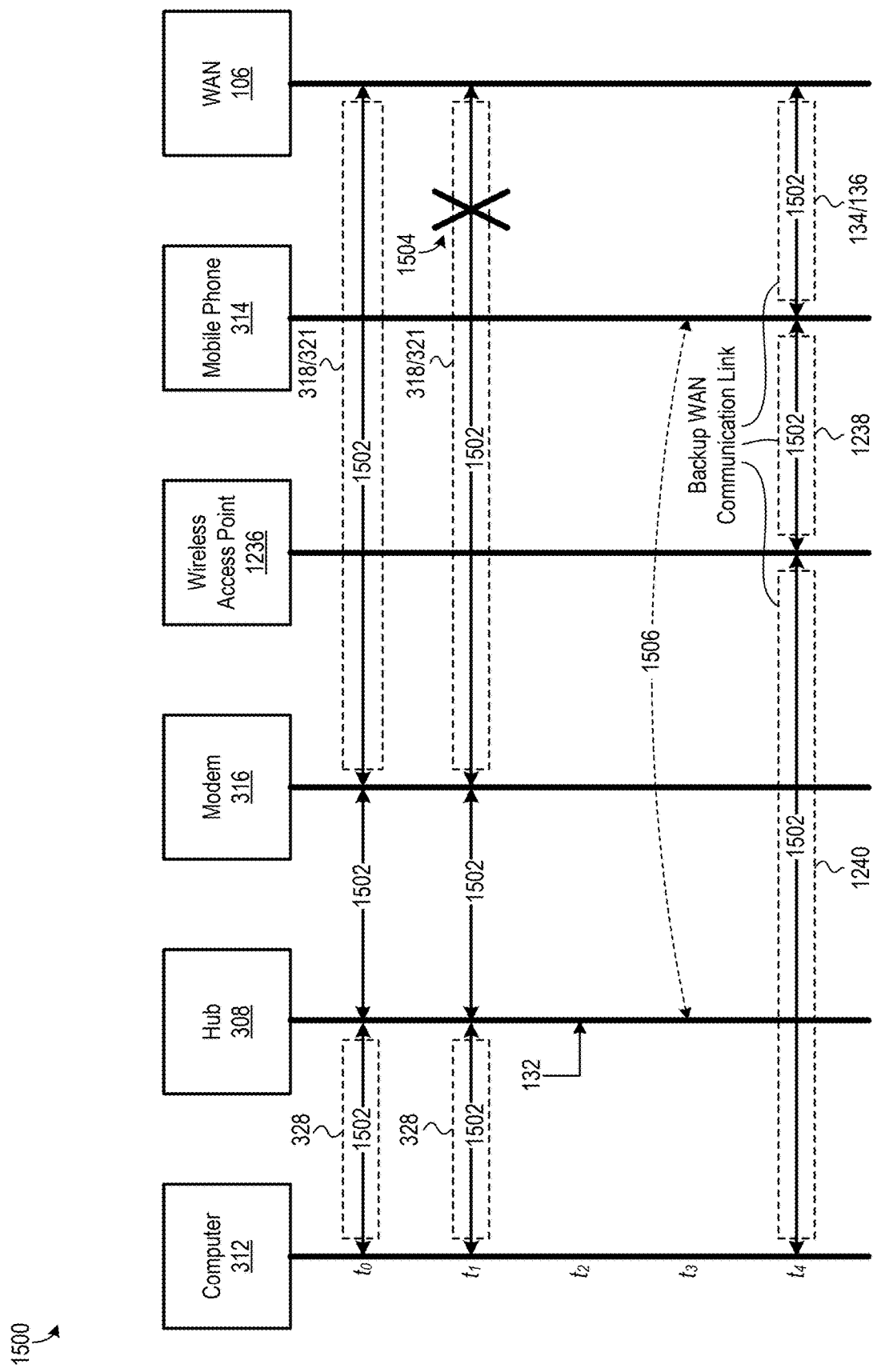
FIG. 15 is a dataflow diagram illustrating another example of operation of the FIG. 12 communication environment.

FIG. 15 is a dataflow diagram 1500 illustrating another example of operation of communication environment 1200. It is understood, however, that communication environment 1200 is not limited to operating according to dataflow diagram 1500.

Dataflow diagram 1500 includes vertical lines logically representing each of computer 312, hub 308, modem 316, wireless access point 1236, mobile phone 314, and WAN 106. At time $t_0$, data 1502, which may be uplink or downlink data, flows between LAN 302 and WAN 106 via the primary WAN communication link. In particular, data 1502 flows (a) between computer 312 and hub 308 via LAN communication link 328, (b) between hub 308 and modem 316, and (c) between modem 316 and WAN 106 via wireline communication link 318 and logical communication link 321. At time $t_1$, however, a problem occurs with the primary communication link, such that flow of data 1502 between modem 316 and WAN 106 is interrupted 1504. Redundancy module 124 of hub 308 receives notification message 132 at time $t_2$ indicating occurrence of the problem with the primary communication link. In response thereto, redundancy module 124 cooperates with mobile phone 314 at time $t_3$ to establish 1506 a backup WAN communication link via wireless access point 1236 using mobile phone 314's WAN communication link. For example, redundancy module 124 may authenticate itself with mobile phone 314 and subsequently request that mobile phone 314 act as a termination device for its WAN communication link, such as by turning on a Wi-Fi hotspot of mobile phone 314 or by turning on an analogous function of mobile phone 314. At time $t_4$, the backup WAN communication link between LAN 1202 and WAN 106 is active, where the backup communication link includes LAN communication link 1238, wireless communication link 134, and logical communication link 136. It should be noted that the backup WAN communication link does not include LAN communication link 1230 in this example as data flowing through the backup WAN communication link bypasses hub 308. Accordingly, at time $t_4$, data 1502 flows (a) between computer 312 and wireless access point 1236 via LAN communication link 1240, (b) between wireless access point 1236 and mobile phone 314 via LAN communication link 1238, and (c) between mobile phone 314 and WAN 106 via wireless communication link 134 and logical communication link 136.

Figure 16:
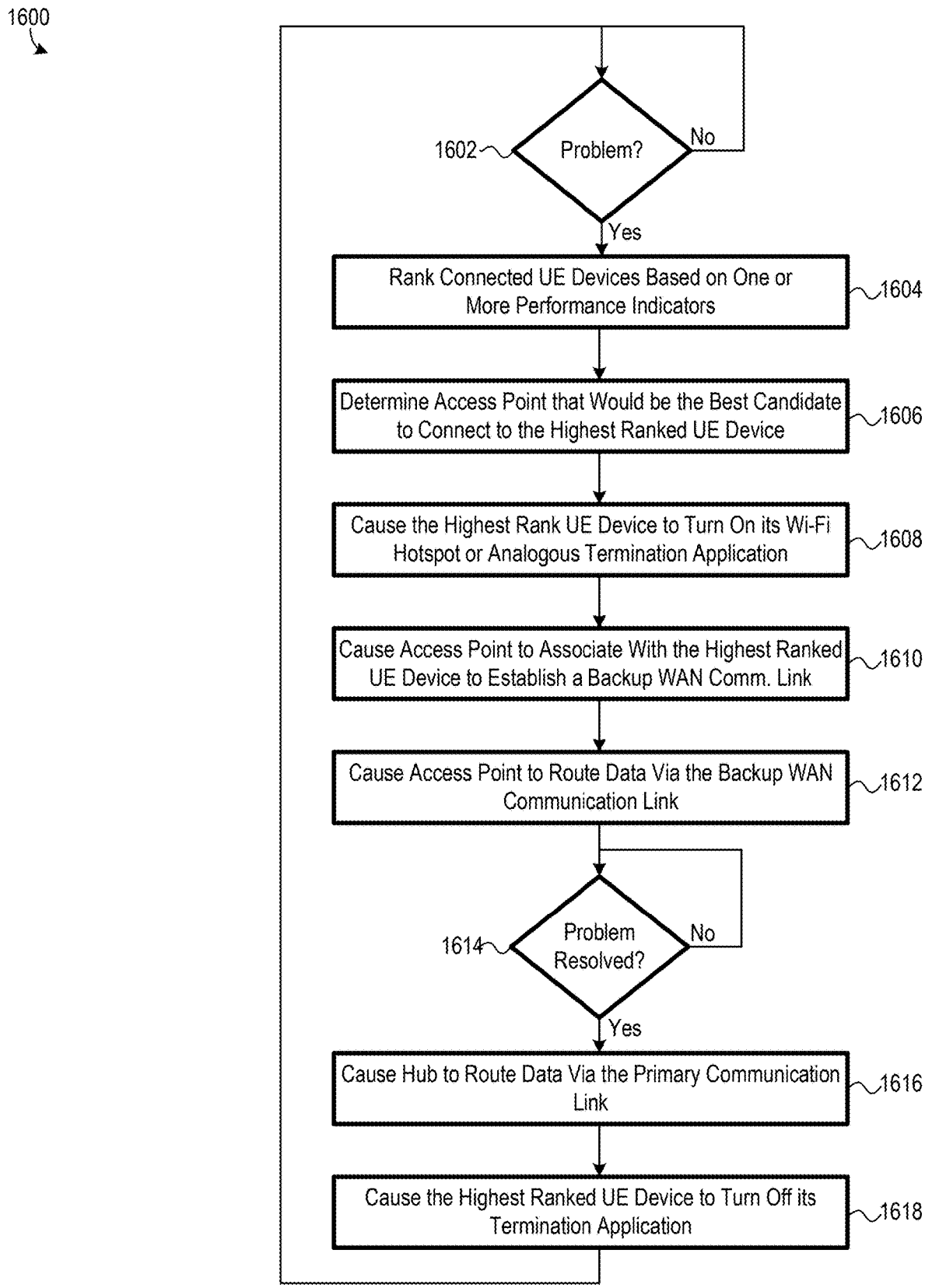
FIG. 16 is a flow chart of another method for automatic redundant connections, according to an embodiment.

FIG. 16 is flow chart of a method 1600 for automatic redundant connections, which is another embodiment of the new methods disclosed herein. In a decision block 1602, redundancy module 124 determines whether there is a problem with the primary WAN communication link for LAN 1202. In one example of block 1602, redundancy module 124 determines that there is a problem with the primary WAN communication link in response to receiving a notification message 132 within a predetermined time frame. As another example of block 1602, redundancy module 124 determines that there is not a problem with the primary WAN communication link in response to not receiving a notification message 132 within a predetermined time frame. If the result of decision block 1602 is no, decision block 1602 repeats, optionally after a waiting for a delay period to expire (not shown). If the result of decision block 1602 is yes, method 1600 proceeds to a block 1604 where redundancy module 124 ranks UE devices that are connected to LAN 1202 based one or more performance indicators, to rank suitability of the UE devices for supporting a backup WAN communication link for LAN 1202. For example, redundancy module 124 may rank mobile phone 314 first and computer 312 second, such as based on throughput of their respective WAN communication links, received signal strength of their respective WAN communication links, latency of their respective WAN communication links, throughput of their respective LAN communication links, received signal strength of their respective LAN communication links, and/or latency of their respective LAN communication links. In particular embodiments, television 310 is not included in the ranking because it does not have its own WAN communication link.

In a block 1606, redundancy module 124 determines which wireless access point would be the best candidate to connect to the highest ranked UE device, such as based on quality of respective wireless communication links between the highest ranked UE device and available wireless access points. For example, redundancy module 124 may determine that (a) mobile phone 314 is highest ranked UE device of LAN 1202 and (b) wireless access point 1236 has a better wireless connection with mobile phone 314 than radio 327 of hub 308. Redundancy module 124 may therefore determine that wireless access point 1236 is the best candidate to connect to mobile phone 314.

In a block 1608, redundancy module 124 causes the highest rank UE device to turn in its termination application, such as a Wi-Fi hotspot or an analogous application, which allows the UE device to serve as a wireless access point for LAN 1202. For example, redundancy module 124 may cause mobile phone 314 to turn its Wi-Fi mobile hotspot. In a block 1610, redundancy module 124 causes the wireless access point identified in block 1606 as being the best candidate, e.g., hub 308 or wireless access point 1236, to associate with the selected UE device, to establish a backup WAN communication link. For example, redundancy module 124 may cause wireless access point 1236 to associate with the Wi-Fi hotspot of mobile phone 314, to establish a backup WAN communication link to serve LAN 302. In block 1612, redundancy module 124 causes hub 308 to route data between LAN 302 and WAN 106 via the backup WAN communication link established in block 1610. For example, redundancy module 124 may cause wireless access point 1236 to route data between LAN 302 and WAN 106 via a backup WAN communication link including LAN communication link 1230, LAN communication link 1238, wireless communication link 134, and logical communication link 136.

In a decision block 1614, redundancy module 124 determines whether the problem with the primary WAN communication link has been resolved. Although FIG. 16 depicts decision block 1614 as being performed after block 1612, decision block 1614 could be also be performed concurrently with block 1612. In one example of decision block 1614, redundancy module 124 determines that the problem with the primary WAN communication link has been resolved in response to redundancy module 124 receiving a second notification message 133 (see FIG. 12) indicating the problem has been resolved. If the result of decision block 1614 is no, decision block 1614 repeats, optionally after a waiting for a delay period to expire (not shown). If the result of decision block 1614 is yes, method 1600 proceeds to a block 1616 where redundancy module 124 causes hub 308 to route data between LAN 1202 and WAN 106 using the primary WAN communication link, instead of using the backup WAN communication link established in block 1610. In a block 1618, redundancy module 124 causes the selected UE device to turn off its termination application. In one example of block 1618, redundancy module 124 causes mobile phone 314 to turn off its Wi-Fi hotspot.

Figure 17:
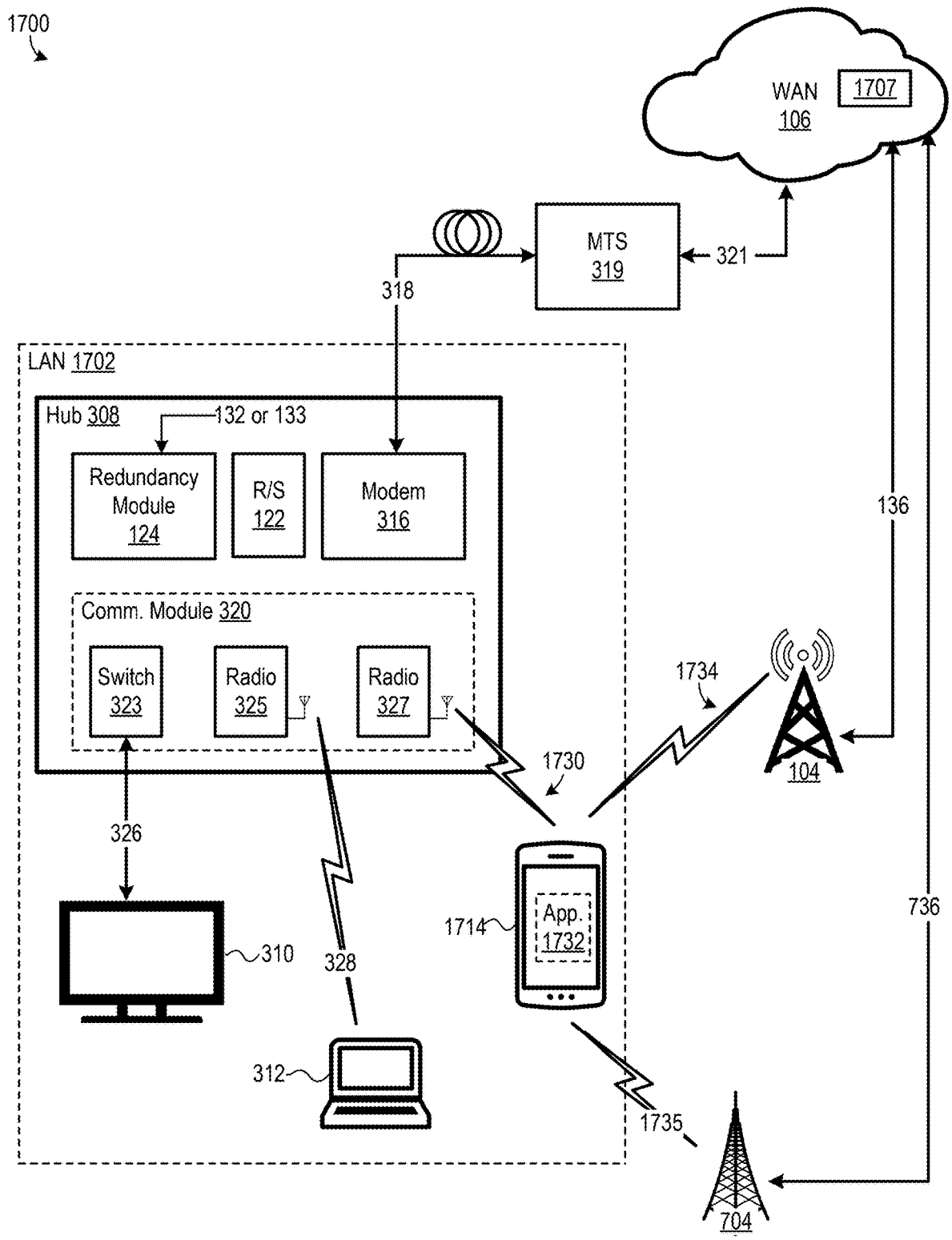
FIG. 17 is a block diagram of an alternate embodiment of the FIG. 7 communication environment further including a mobile phone capable of supporting two or more subscriber identities.

FIG. 17 is a block diagram of a communication environment 1700, which is an alternate embodiment of communication environment 700 (FIG. 7) where LAN 302 is replaced with a LAN 1702. LAN 1702 is like LAN 302 except that LAN 1702 includes mobile phone 1714 in place of mobile phone 314. Mobile phone 1714 is capable of supporting multiple subscriber identities such that mobile phone 1714 can connect to two or more cellular wireless access networks, e.g., two or more cellular wireless access networks operated by different, or the same, carriers. For example, FIG. 17 illustrates mobile phone 1714 being (a) connected to wireless communication node 104 by a wireless communication link 1734 and (b) connected to wireless communication node 704 via a wireless communication link 1735. Mobile phone 1714 is communicatively coupled to hub 308 via a LAN communication link 1730, which is a wireless communication link. In certain embodiments, LAN communication link 1730 is either a Wi-Fi wireless communication link or a Bluetooth wireless communication link. Mobile phone 1714 includes an application 1732 analogous to application 332 of mobile phone 314.

The fact that mobile phone 1714 is capable of connecting to two or more cellular wireless access networks enables redundancy module 124 to establish two or more different backup WAN communication links using mobile phone 1714. For example, redundancy module 124 may cooperate with application 1732 to establish a first backup WAN communication link including LAN communication link 1730, wireless communication link 1734, and logical communication link 136. As another example, redundancy module 124 may cooperate with application 1732 to establish a second backup WAN communication link including LAN communication link 1730, wireless communication link 1735, and logical communication link 736. Redundancy module 124 may be configured to establish only one of the first and second backup WAN communication links in response to failure of the primary WAN communication link. For example, redundancy module 124 may select whichever of the first and second backup WAN communication links is best suited for serving LAN 1702, such as based on whichever backup WAN communication link has the highest throughput, highest received signal strength, lowest latency, and/or has historically been the best performing. Alternately, redundancy module 124 may be configured to establish both of the first and second backup WAN communication links in response to failure of the primary WAN communication link. In embodiments where redundancy module 124 establishes both of the backup WAN communication links, hub 308 may cooperate with an optional server 1707 of WAN 106 to steer, split, and/or switch data between the two backup WAN communication links. Additionally, server 1707 may be configured such that the two backup WAN communication links are represented by a common IP address in WAN 106.

Figure 18:
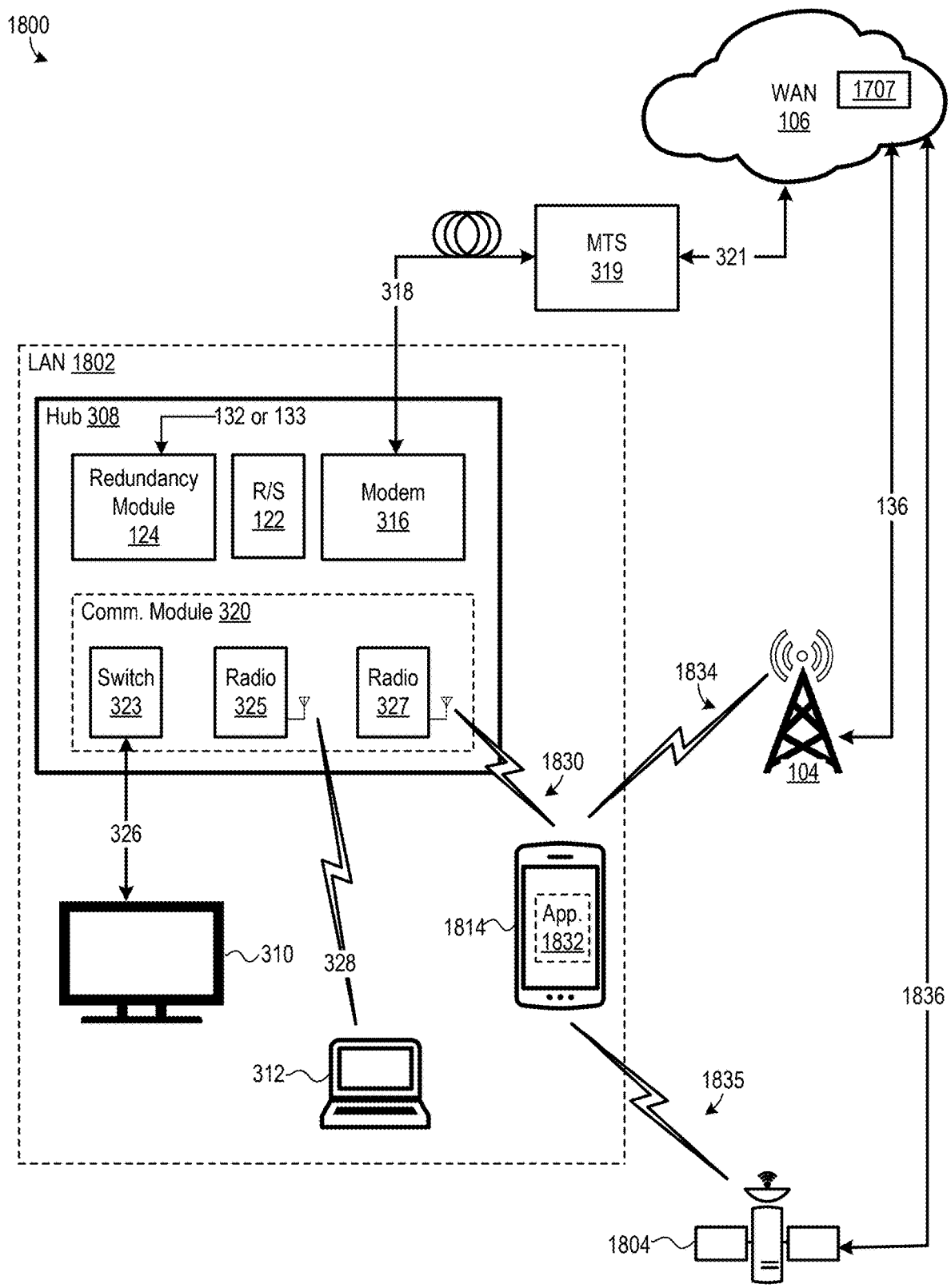
FIG. 18 is a block diagram of an alternate embodiment of the FIG. 17 communication environment further including a mobile phone capable of connecting to both a cellular wireless access communication network and a satellite wireless access communication network.

FIG. 18 is a block diagram of a communication environment 1800, which is an alternate embodiment of communication environment 1700 (FIG. 17) where LAN 1702 is replaced with a LAN 1802. LAN 1802 is like LAN 1702 except that LAN 1802 includes mobile phone 1814 in place of mobile phone 1714. Mobile phone 1814 is capable of supporting multiple subscriber identities such that mobile phone 1814 can connect to at least one cellular wireless access network and at least one satellite wireless access network. For example, FIG. 18 illustrates mobile phone 1814 being (a) connected to wireless communication node 104 by a wireless communication link 1834 and (b) connected to a wireless communication satellite 1804 via a wireless communication link 1835. Satellite 1804 is communicatively coupled to WAN 106 via a logical communication link 1836 which includes, for example, a satellite ground station and/or a satellite wireless core network. Mobile phone 1814 is communicatively coupled to hub 308 via a LAN communication link 1830, which is a wireless communication link. In certain embodiments, LAN communication link 1830 is either a Wi-Fi wireless communication link or a Bluetooth wireless communication link. Mobile phone 1814 includes an application 1832 analogous to application 332 of mobile phone 314.

Similar to as discussed above with respect to FIG. 17, redundancy module 124 may establish two different backup WAN communication links using mobile phone 1814. In particular, redundancy module 124 may cooperate with application 1832 to establish a first backup WAN communication link including LAN communication link 1830, wireless communication link 1834, and logical communication link 136. Additionally, redundancy module 124 may cooperate with application 1832 to establish a second backup WAN communication link including LAN communication link 1830, wireless communication link 1835, and logical communication link 1836. Redundancy module 124 may be configured to establish one of the two backup WAN communication links or both of the two backup WAN communication links in response to failure of the primary WAN communication link serving LAN 1802.

Figure 19:
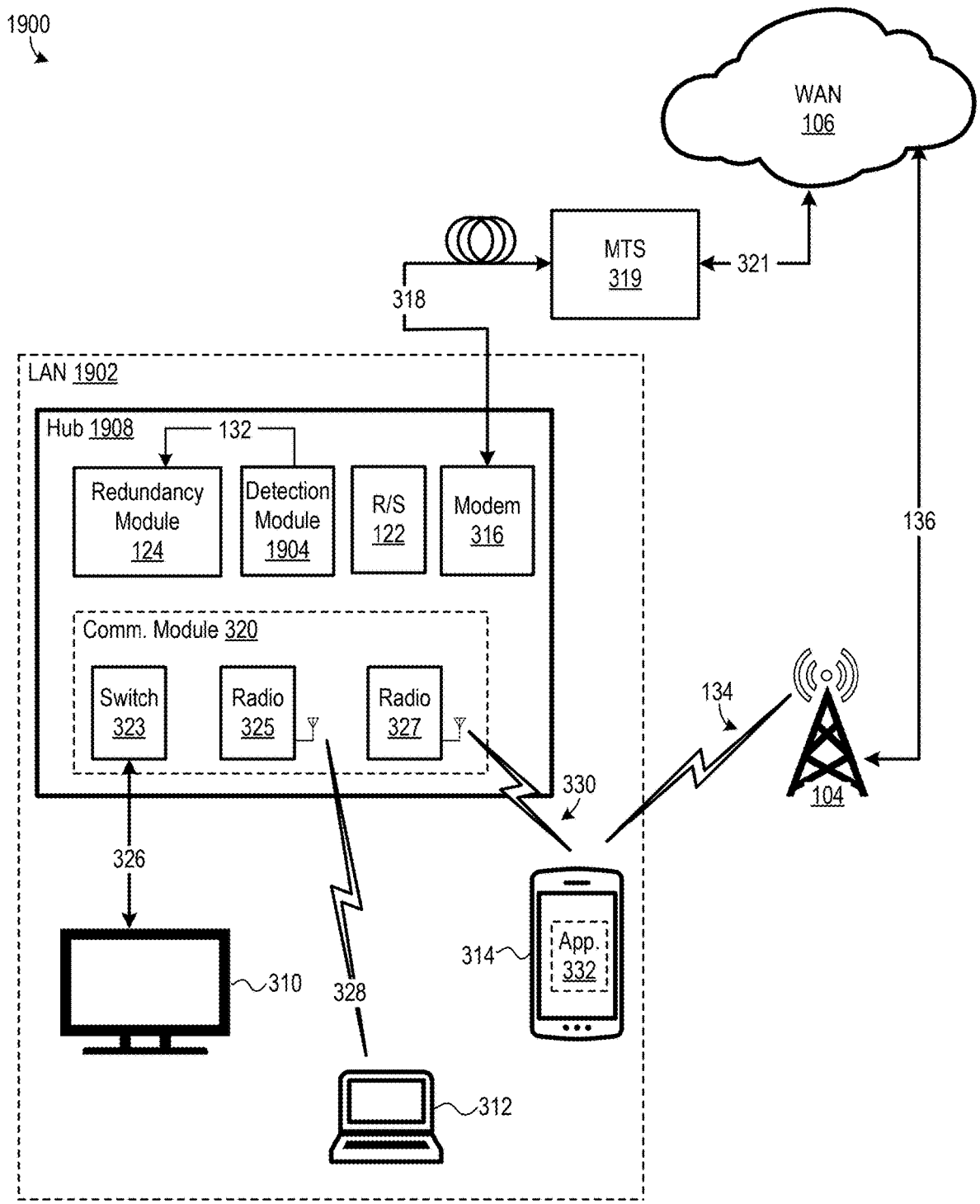
FIG. 19 is a block diagram of an embodiment of the FIG. 3 communication environment where a notification message is generated internal to a network hub.

As discussed above, notification message 132 could be generated either internal to hub 308 or external to hub 308. For example, FIG. 19 is a block diagram of a communication environment 1900, which is an embodiment of communication environment 300 (FIG. 3) where notification message 132 is generated internal to a hub. In particular, communication environment includes LAN 1902 which is an embodiment of LAN 302, and LAN 1902 includes a hub 1908 which is an embodiment of hub 308. Hub 1908 includes a detection module 1904 configured to generate notification message 132 in response to failure of a primary communication link serving LAN 1902. Detection module 1904 detects failure of the primary communication link, for example, based on information from modem 316 and/or in response to the primary WAN communication link failing to transmit data.

Figure 20:
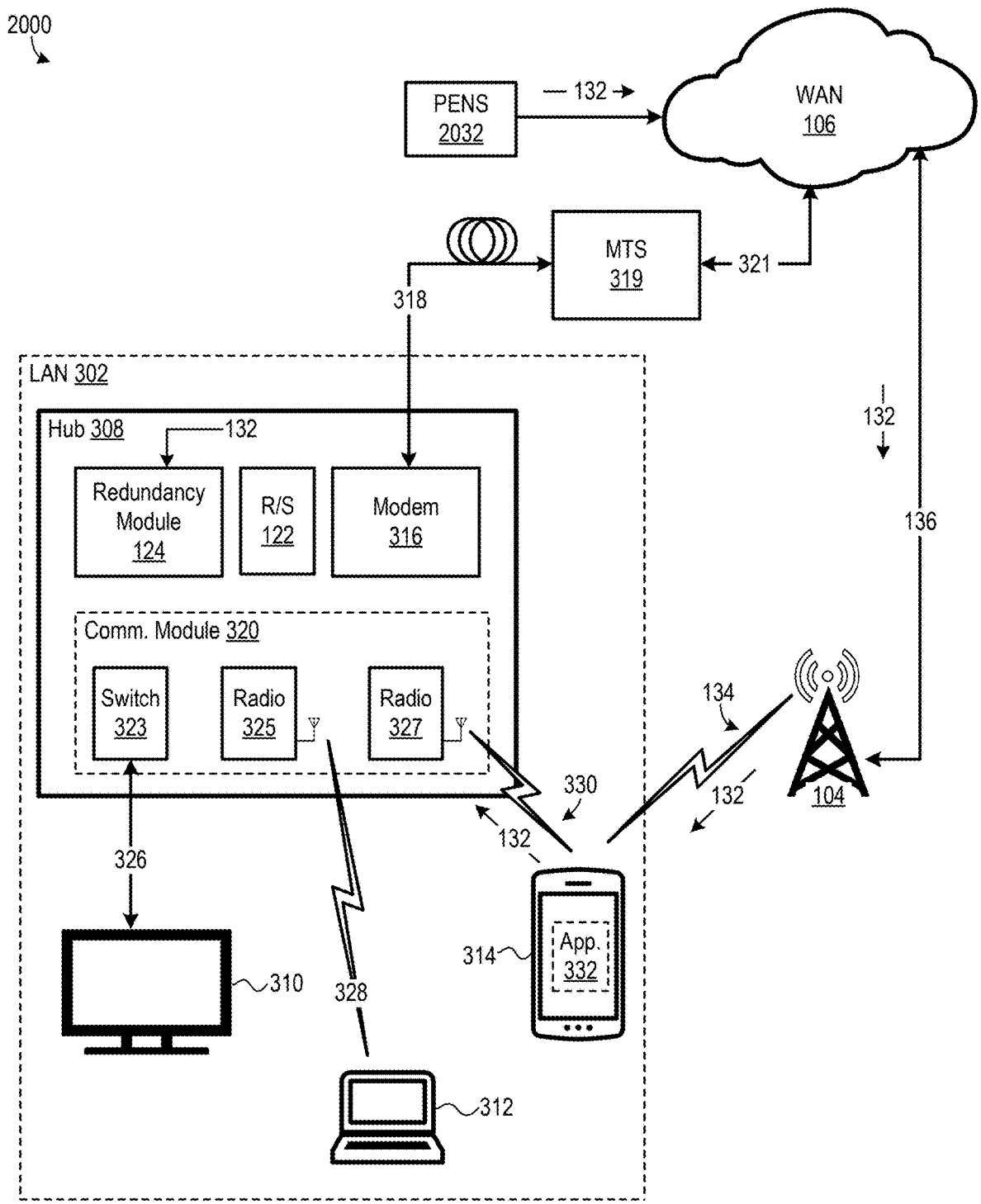
FIG. 20 is a block diagram of an embodiment of the FIG. 3 communication environment where a notification message is generated external to a network hub.

FIG. 20 is a block diagram of a communication environment 2000, which is an embodiment of communication environment 300 (FIG. 3) where notification message 132 is generated external to a hub. Communication environment includes a PENS 2032 which is configured to generate notification message 132 in response to a power failure affecting one or more wireline communication link 318, MTS 319, and logical communication link 321. PENS 2032 sends notification message 132 to hub 308 via logical communication link 136, wireless communication link 134, and LAN communication link 330.

Figure 21:
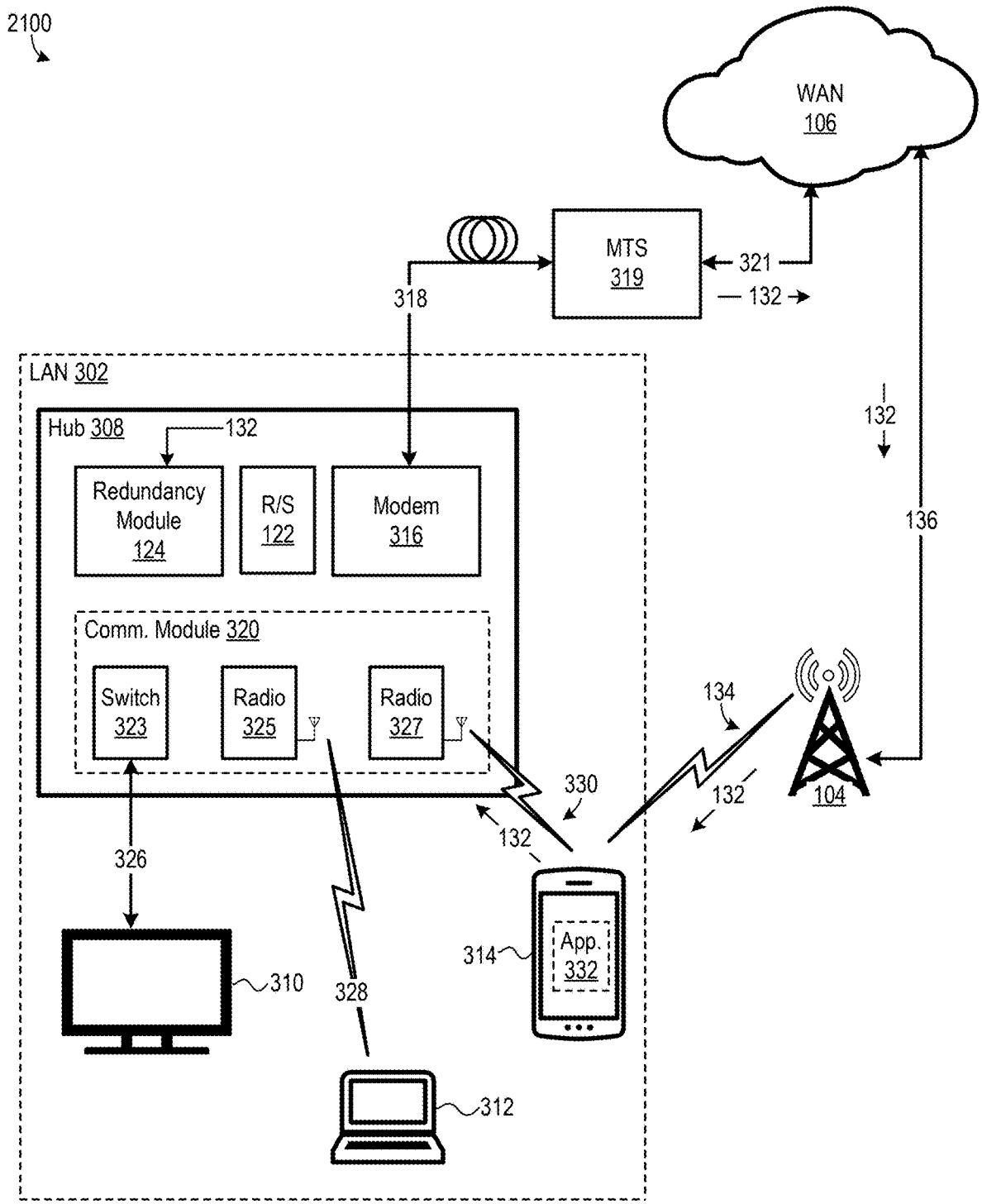
FIG. 21 is a block diagram of another embodiment of the FIG. 3 communication environment where a notification message is generated external to a network hub.

FIG. 21 is a block diagram of a communication environment 2100, which is another embodiment of communication environment 300 (FIG. 3) where notification message 132 is generated external to a hub. MTS 319 is configured in this embodiment to generate notification message 132 in response to a problem occurring in wireline communication link 318. For example, MTS 319 may be configured to generate notification message 132 in response to failure of wireline communication link 318 or degradation of wireline communication link 318 (e.g., throughput of wireline communication link 318 dropping below a threshold value or latency of wireline communication link 318 rising above a threshold value). MTS 319 sends notification message 132 to hub 308 via logical communication link 321, logical communication link 136, wireless communication link 134, and LAN communication link 330.

Figure 22:
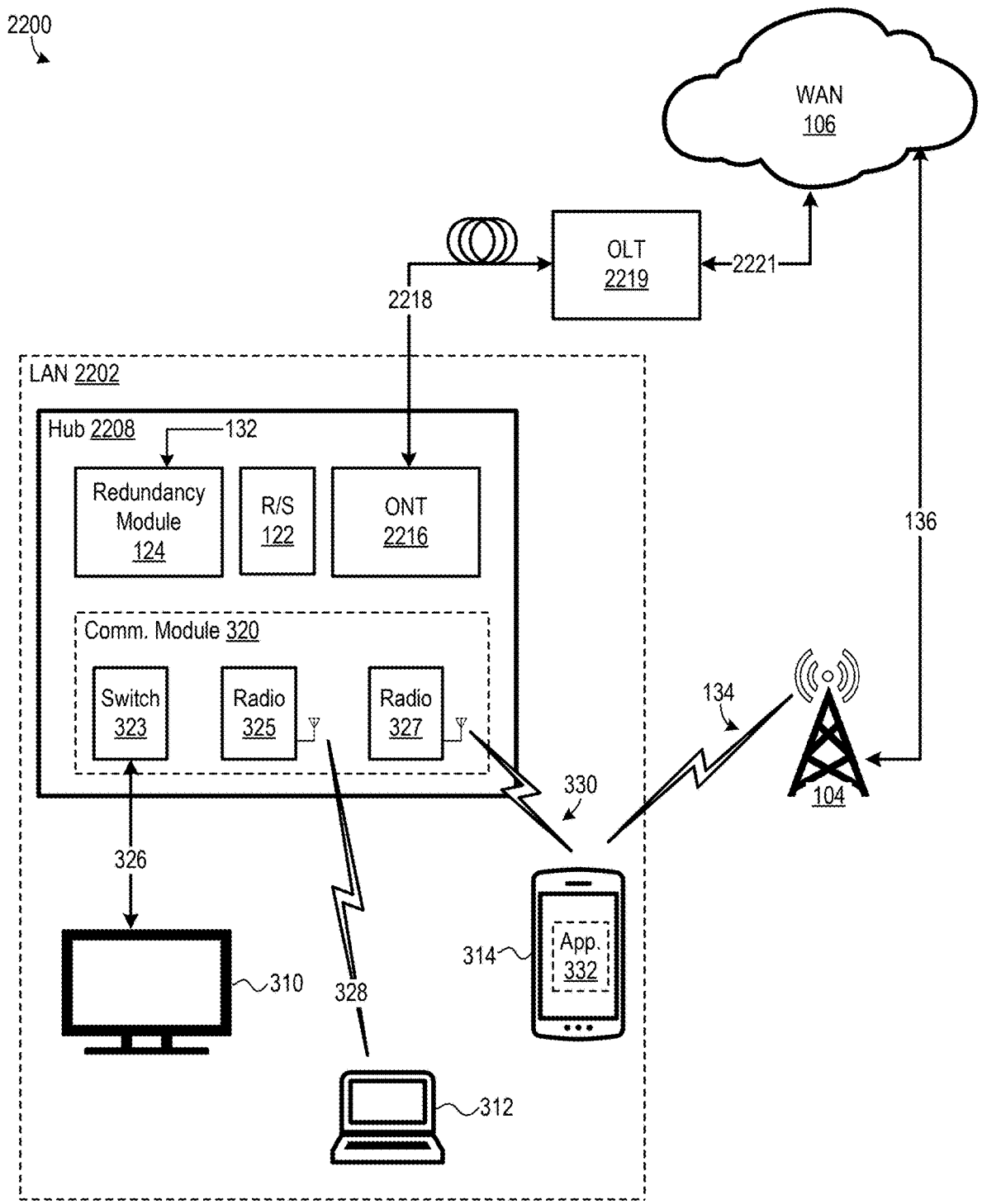
FIG. 22 is a block diagram of an alternate embodiment of the FIG. 3 communication environment where a primary WAN communication link includes an optical communication link.

FIG. 22 is a block diagram of a communication environment 2200, which is an alternate embodiment of communication environment 300 (FIG. 3) where a primary WAN communication link includes an optical communication link. In particular, LAN 302 of communication environment 300 is replaced with a LAN 2202 in communication environment 2200, where LAN 2202 includes a hub 2208 in place of hub 308. Hub 2208 is like hub 308 except that hub 2208 includes an ONT 2216 in place of modem 316. The primary WAN communication link of communication environment 2200 is embodied by an optical cable 2218, an optical line terminal (OLT) 2219, and a logical communication link 2221.

Figure 23:
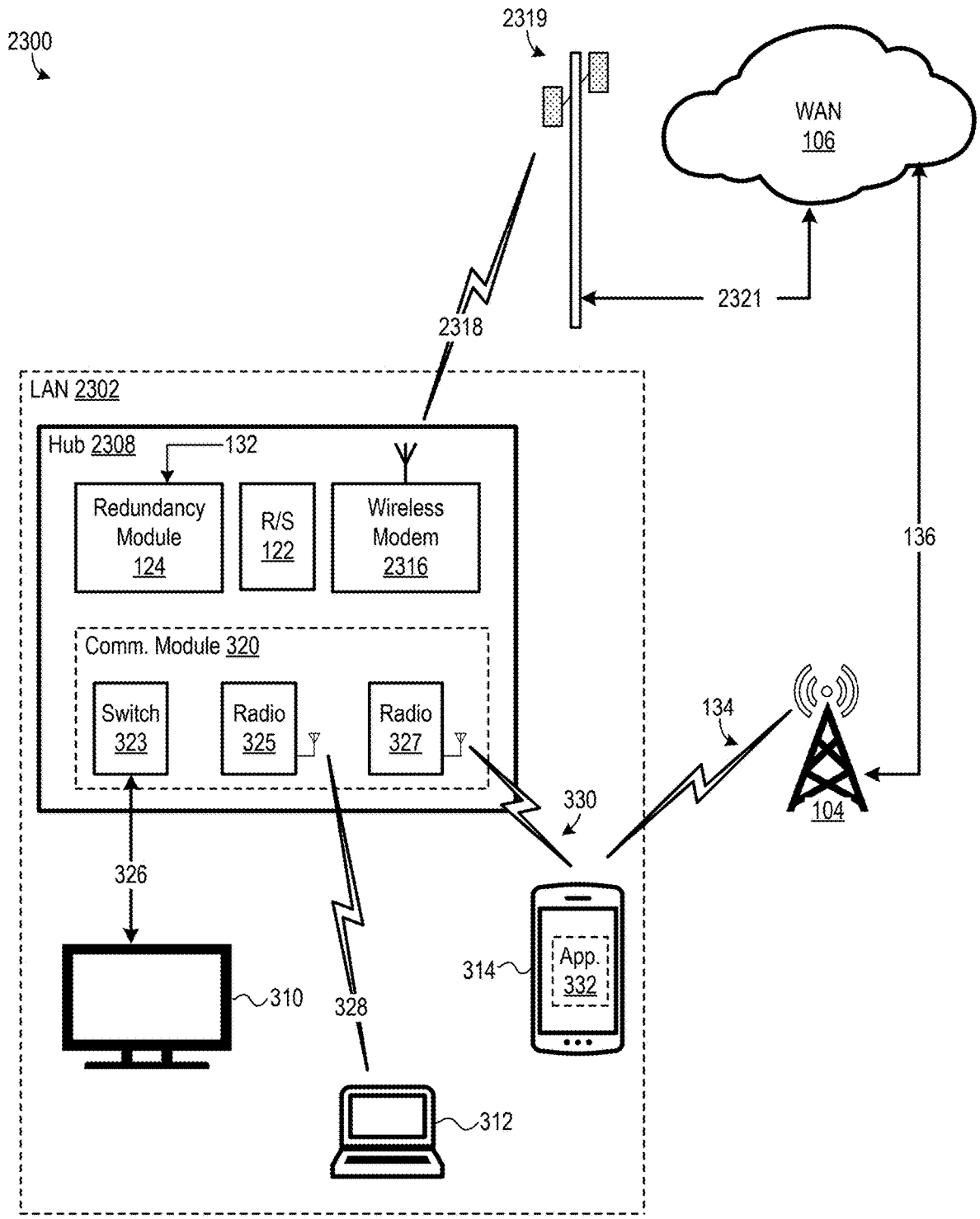
FIG. 23 is a block diagram of an alternate embodiment of the FIG. 3 communication environment where a primary WAN communication link includes a fixed wireless communication link.

FIG. 23 is a block diagram of a communication environment 2300, which is an alternate embodiment of communication environment 300 (FIG. 3) where a primary WAN communication link includes a fixed wireless communication link. In particular, LAN 302 of communication environment 300 is replaced with a LAN 2302 in communication environment 2300, where LAN 2302 includes a hub 2308 in place of hub 308. Hub 2308 is like hub 308 except that hub 2308 includes a wireless modem 2316 in place of modem 316. The primary WAN communication link of communication environment 2300 is embodied by a wireless communication link 2318, a wireless communication node 2319, and a logical communication link 2321. In some embodiments, wireless communication link 2318 is a cellular wireless communication link (e.g., a cellular wireless communication link operating according to a 3GPP standard, including but not limited to an LTE cellular wireless communication link, a 5G cellular wireless communication link, and/or a 6G cellular wireless communication link).

Figure 24:
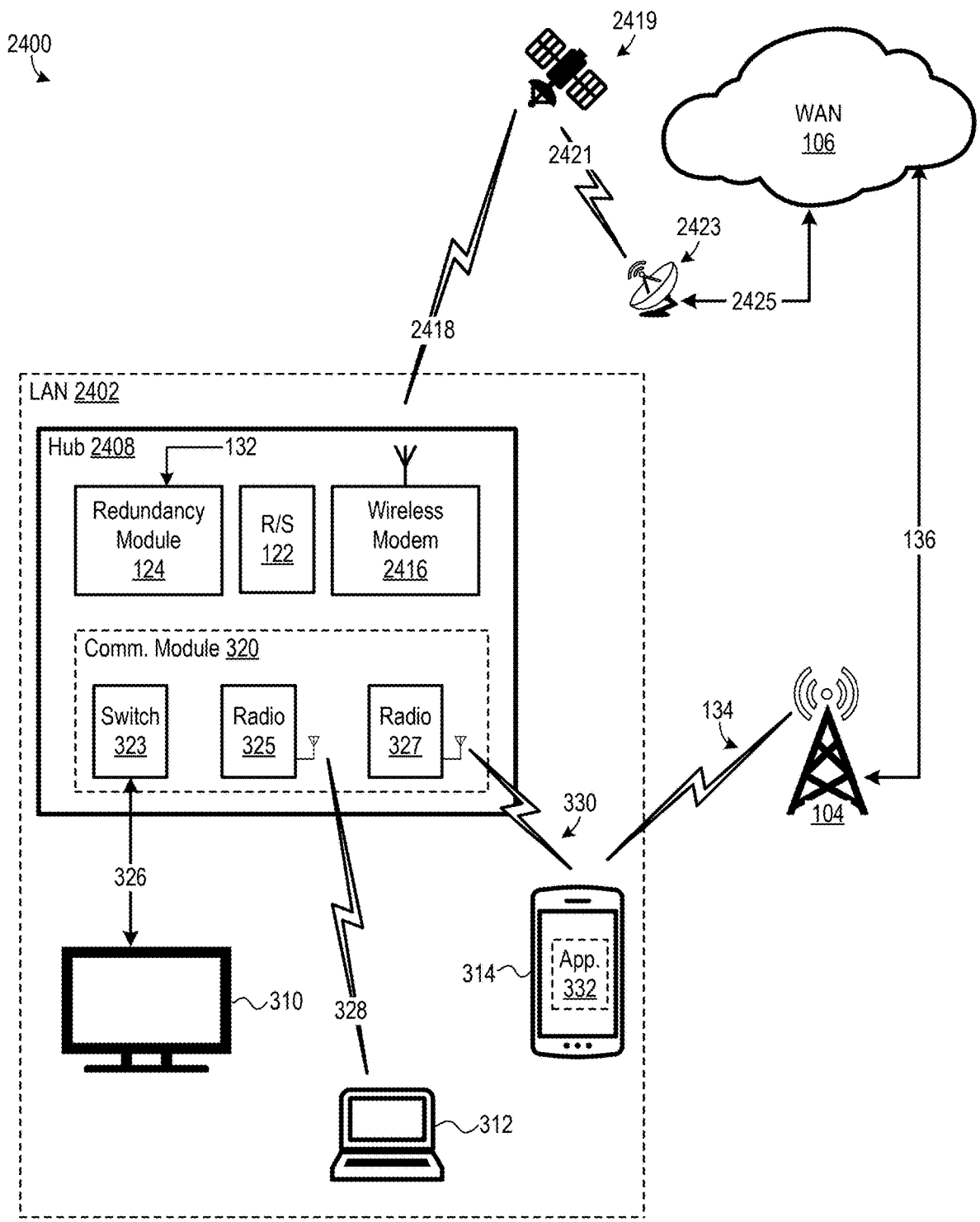
FIG. 24 is a block diagram of an alternate embodiment of the FIG. 3 communication environment where a primary WAN communication link includes a satellite wireless communication link.

FIG. 24 is a block diagram of a communication environment 2400, which is an alternate embodiment of communication environment 300 (FIG. 3) where a primary WAN communication link includes a satellite wireless communication link. In particular, LAN 302 of communication environment 300 is replaced with a LAN 2402 in communication environment 2400, where LAN 2402 includes a hub 2408 in place of hub 308. Hub 2408 is like hub 308 except that hub 2408 includes a wireless modem 2416 in place of modem 316. The primary WAN communication link of communication environment 2400 is embodied by a wireless communication link 2418, a satellite 2419, a wireless communication link 2421, a satellite ground station 2423, and a logical communication link 2425.

Figure 25:
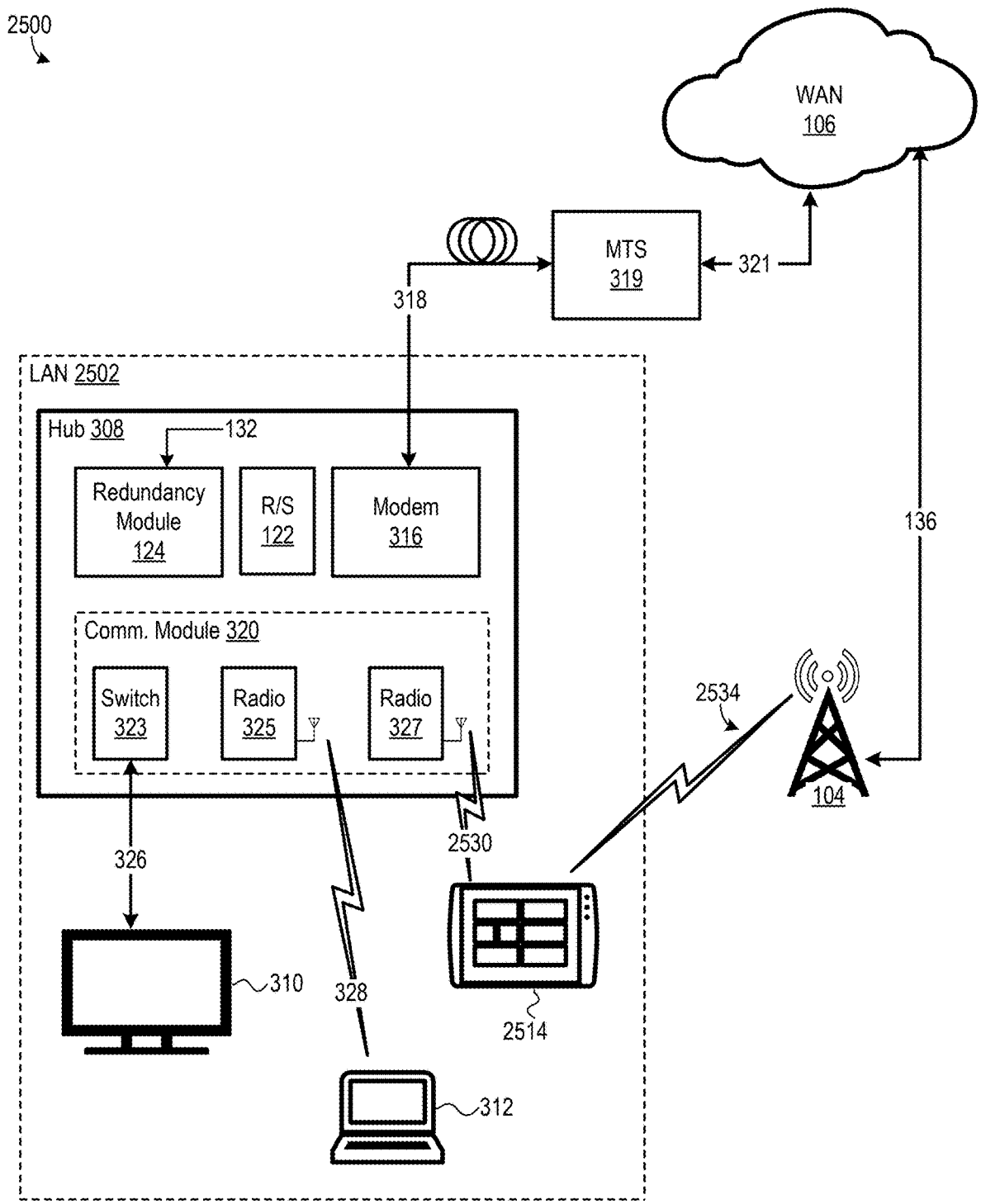
FIG. 25 is a block diagram of an alternate embodiment of the FIG. 3 communication environment where a tablet computer may be used to provide a backup WAN communication link.

FIG. 25 is a block diagram of a communication environment 2500, which is an alternate embodiment of communication environment 300 (FIG. 3) where LAN 302 is replaced with a LAN 2502. LAN 2502 is like LAN 302 except that mobile phone 314 is replaced with a tablet computer 2514. Tablet computer 2514 includes a radio (not shown) capable of communicating with wireless communication node 104. Accordingly, tablet computer 2514 is communicatively coupled to wireless communication node 104 via a wireless communication link 2534. In certain embodiments, wireless communication link 2534 is a cellular wireless communication link (e.g., a cellular wireless communication link operating according to a 3GPP standard, including but not limited to an LTE cellular wireless communication link, a 5G cellular wireless communication link, and/or a 6G cellular wireless communication link). In some other embodiments, wireless communication link 2534 is a Wi-Fi wireless communication link or a LORA (LoRaWAN).

Tablet computer 2514 is also communicatively coupled to hub 308 via a LAN communication link 2530, which is a wireless communication link (e.g., a Wi-Fi wireless communication link or a Bluetooth wireless communication link). Redundancy module 124 is configured to cooperate with tablet computer 2514 to establish a backup WAN communication link in a matter analogous to how redundancy module 124 cooperates with mobile phone 314 to establish a backup WAN communication link. For example, redundancy module 124 may cooperate with tablet computer 2514 to establish a backup WAN communication link including LAN communication link 2530, wireless communication link 2534, and logical communication link 136, in response to redundancy module 124 receiving notification message 132. In some alternate embodiments, tablet computer 2514 is communicatively coupled to hub 308 via an electrical cable instead of via a wireless communication link, and the backup WAN communication link therefore includes an electrical cable in place of LAN communication link 2530.

Figure 26:
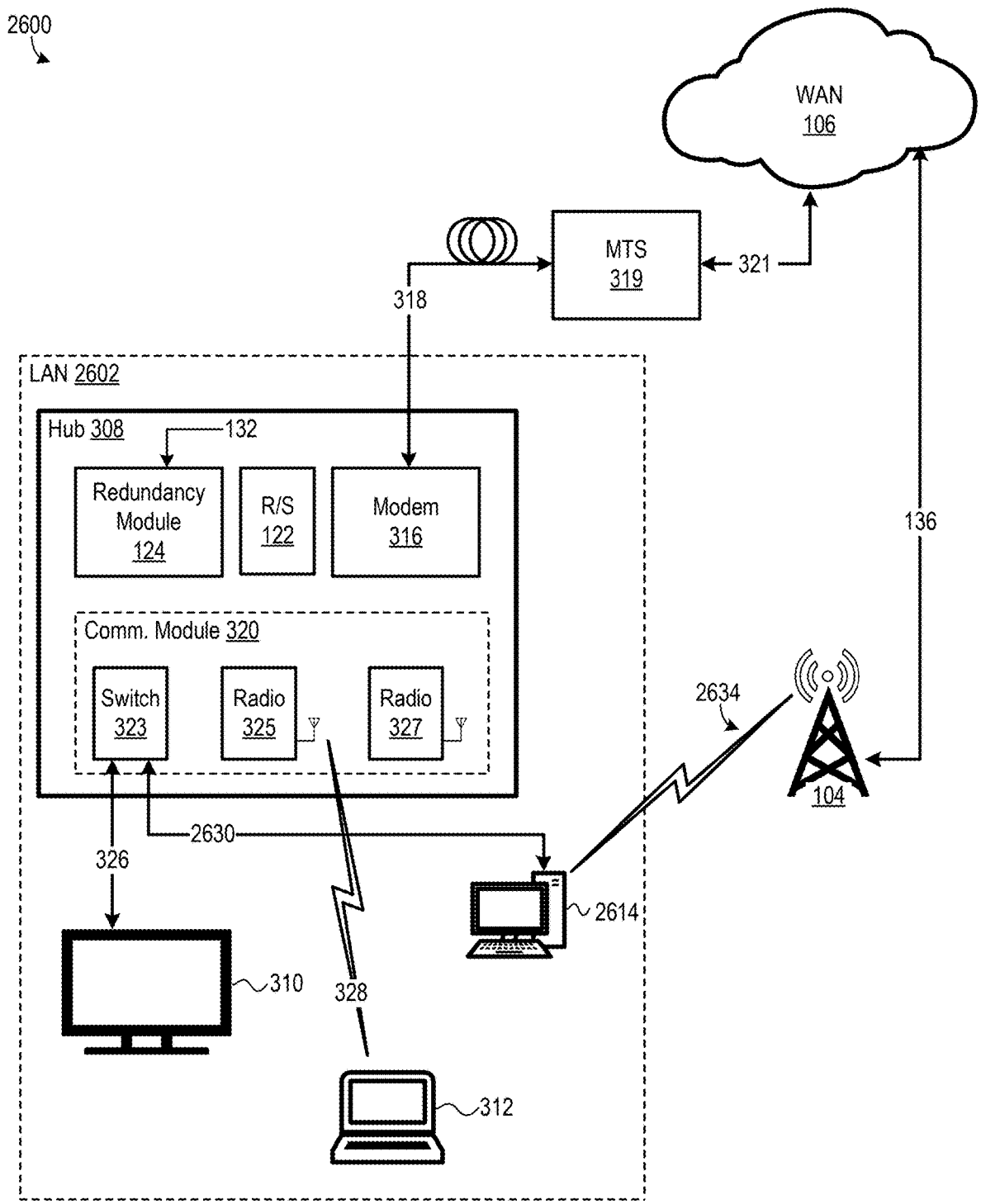
FIG. 26 is a block diagram of an alternate embodiment of the FIG. 3 communication environment where a computer connected to a hub via an Ethernet cable may be used to provide a backup WAN communication link.

FIG. 26 is a block diagram of a communication environment 2600, which is an alternate embodiment of communication environment 300 (FIG. 3) where LAN 302 is replaced with a LAN 2602. LAN 2602 is like LAN 302 except that mobile phone 314 is replaced with a desktop computer 2614. Desktop computer 2614 includes a radio (not shown) capable of communicating with wireless communication node 104. Accordingly, desktop computer 2614 is communicatively coupled to wireless communication node 104 via a wireless communication link 2634. In certain embodiments, wireless communication link 2634 is a cellular wireless communication link (e.g., a cellular wireless communication link operating according to a 3GPP standard, including but not limited to an LTE cellular wireless communication link, a 5G cellular wireless communication link, and/or a 6G cellular wireless communication link). In some other embodiments, wireless communication link 2634 is a Wi-Fi wireless communication link or LoRA (LoRaWAN) wireless communication link.

Desktop computer 2614 is also communicatively coupled to hub 308 via a LAN communication link 2630, which is an Ethernet cable communication link. In some other embodiments, LAN communication 2630 is a USB cable, a coaxial cable, or a telephone cable. Redundancy module 124 is configured to cooperate with desktop computer 2614 to establish a backup WAN communication link in a matter analogous to how redundancy module 124 cooperates with mobile phone 314 to establish a backup WAN communication link. For example, redundancy module 124 may cooperate with desktop computer 2614 to establish a backup WAN communication link including LAN communication link 2630, wireless communication link 2634, and logical communication link 136, in response to redundancy module 124 receiving notification message 132.

Figure 27:
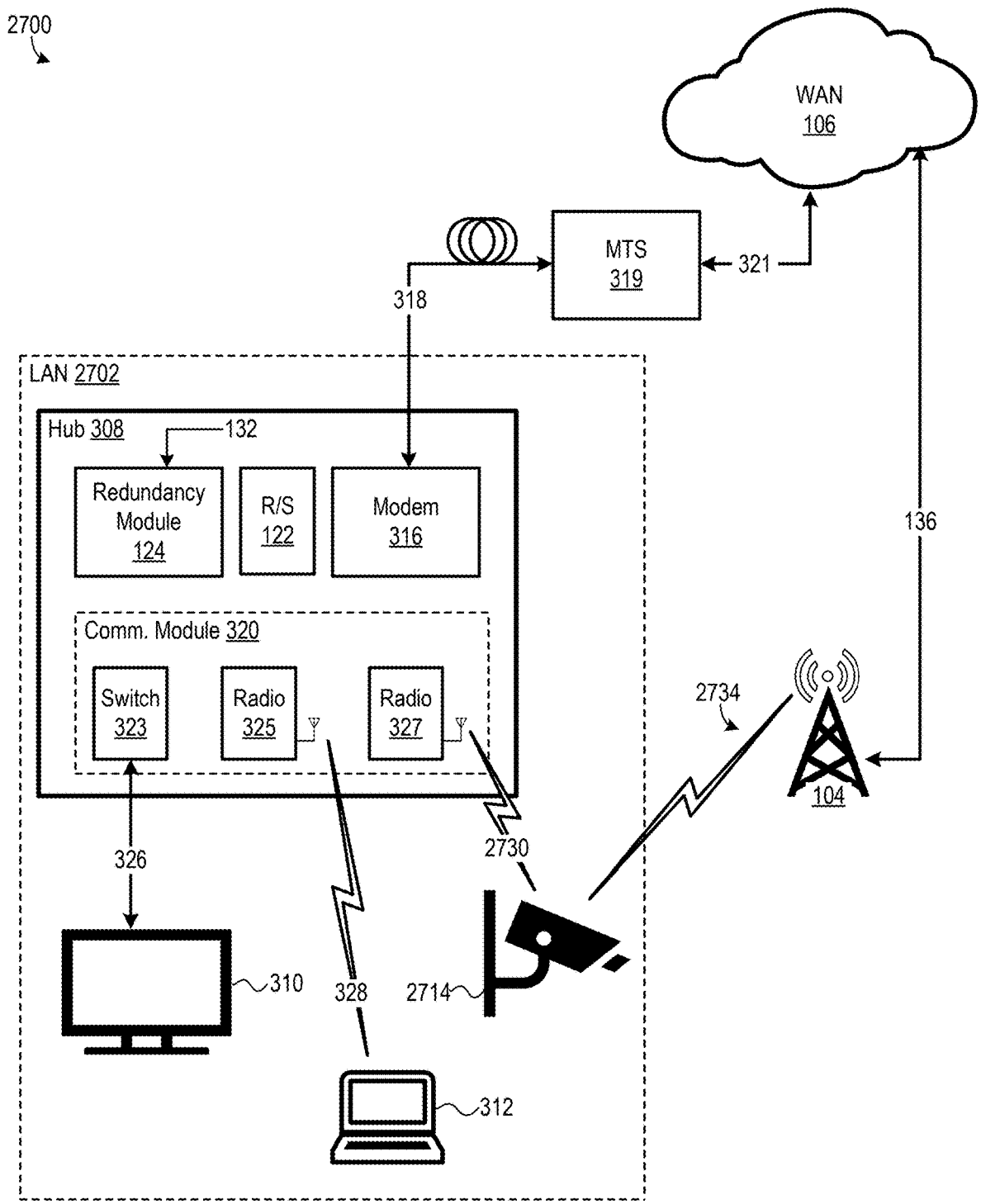
FIG. 27 is a block diagram of an alternate embodiment of the FIG. 3 communication environment where an Internet of Things (IoT) device in the form of a camera may be used to provide a backup WAN communication link.

FIG. 27 is a block diagram of a communication environment 2700, which is an alternate embodiment of communication environment 300 (FIG. 3) where LAN 302 is replaced with a LAN 2702. LAN 2702 is like LAN 302 except that mobile phone 314 is replaced with a camera 2714. Camera 2714 is an IoT device, and camera 2714 is accordingly connected to hub 308 via a LAN communication link 2730, which is a wireless communication link (e.g., a Wi-Fi wireless communication link or a Bluetooth wireless communication link). Additionally, camera 2714 includes a radio (not shown) capable of communicating with wireless communication node 104. Accordingly, camera 2714 is communicatively coupled to wireless communication node 104 via a wireless communication link 2734. In certain embodiments, wireless communication link 2734 is a cellular wireless communication link (e.g., a cellular wireless communication link operating according to a 3GPP standard, including but not limited to an LTE cellular wireless communication link, a 5G cellular wireless communication link, and/or a 6G cellular wireless communication link). In some other embodiments, wireless communication link 2734 is a Wi-Fi wireless communication link or LoRA (LoRaWAN) wireless communication link.

Redundancy module 124 is configured to cooperate with camera 2714 to establish a backup WAN communication link in a matter analogous to how redundancy module 124 cooperates with mobile phone 314 to establish a backup WAN communication link. For example, redundancy module 124 may cooperate with camera 2714 to establish a backup WAN communication link including LAN communication link 2730, wireless communication link 2734, and logical communication link 136, in response to redundancy module 124 receiving notification message 132. It should be noted that camera 2714 may be particularly well suited for providing a backup WAN communication link if camera 2714 is located outdoors because wireless access communication networks (e.g., cellular or satellite wireless access communication networks), are typically capable of providing better coverage at outdoor locations than at indoor locations.

Figure 28:
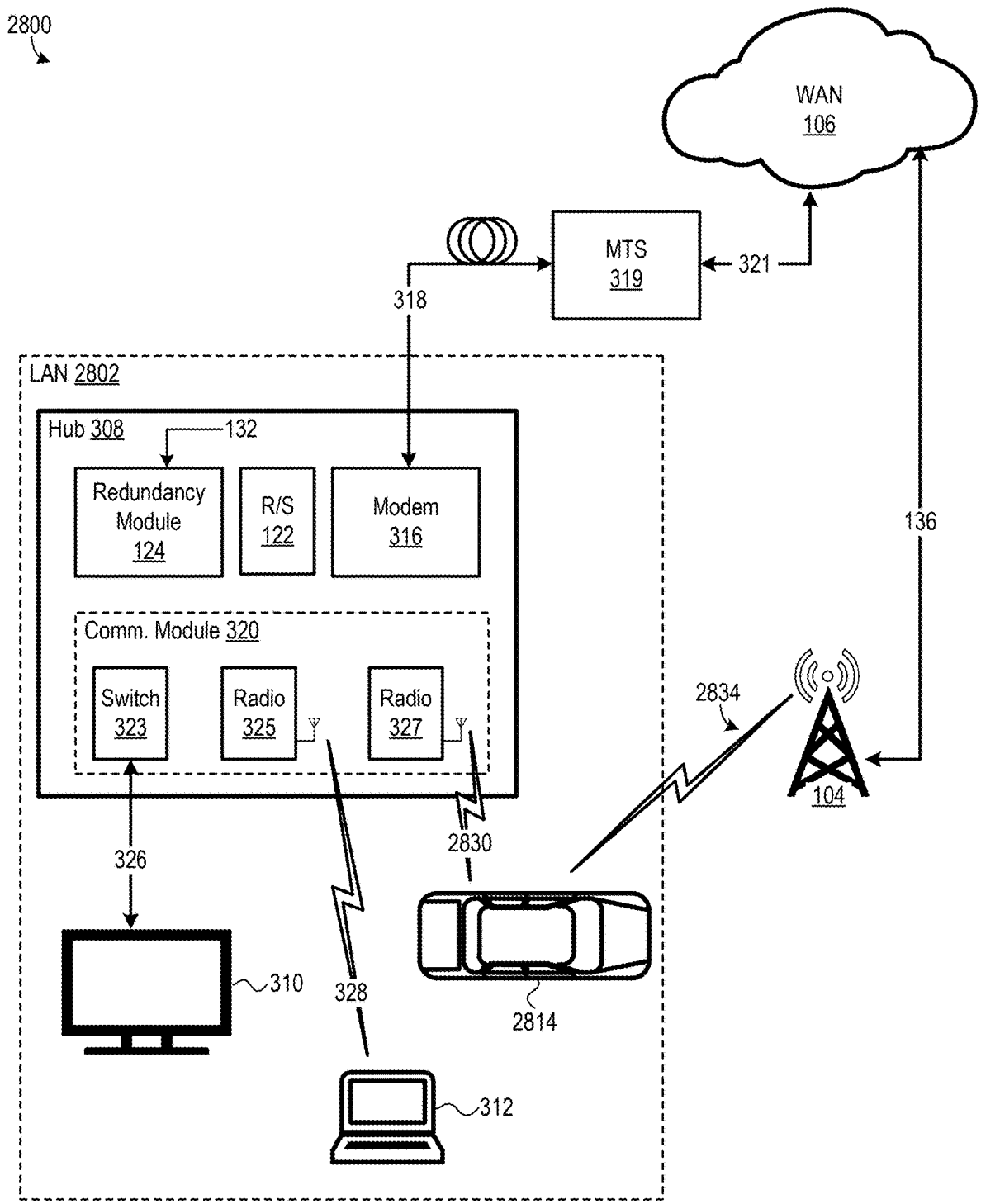
FIG. 28 is a block diagram of an alternate embodiment of the FIG. 3 communication environment where an IoT device in the form of a vehicle may be used to provide a backup WAN communication link.

FIG. 28 is a block diagram of a communication environment 2800, which is an alternate embodiment of communication environment 300 (FIG. 3) where LAN 302 is replaced with a LAN 2802. LAN 2802 is like LAN 302 except that mobile phone 314 is replaced with a vehicle 2814. Vehicle 2814 is an IoT device, and vehicle 2814 is accordingly connected to hub 308 via a LAN communication link 2830, which is a wireless communication link (e.g. a Wi-Fi wireless communication link or a Bluetooth wireless communication link). Additionally, vehicle 2814 includes a radio (not shown) capable of communicating with wireless communication node 104. Accordingly, vehicle 2814 is communicatively coupled to wireless communication node 104 via a wireless communication link 2834. In certain embodiments, wireless communication link 2834 is a cellular wireless communication link (e.g., a cellular wireless communication link operating according to a 3GPP standard, including but not limited to an LTE cellular wireless communication link, a 5G cellular wireless communication link, and/or a 6G cellular wireless communication link). In some other embodiments, wireless communication link 2834 is a Wi-Fi wireless communication link or LoRA (LoRaWAN) wireless communication link.

Redundancy module 124 is configured to cooperate with vehicle 2814 to establish a backup WAN communication link in a matter analogous to how redundancy module 124 cooperates with mobile phone 314 to establish a backup WAN communication link. For example, redundancy module 124 may cooperate with vehicle 2814 to establish a backup WAN communication link including LAN communication link 2830, wireless communication link 2834, and logical communication link 136, in response to redundancy module 124 receiving notification message 132.

Figure 29:
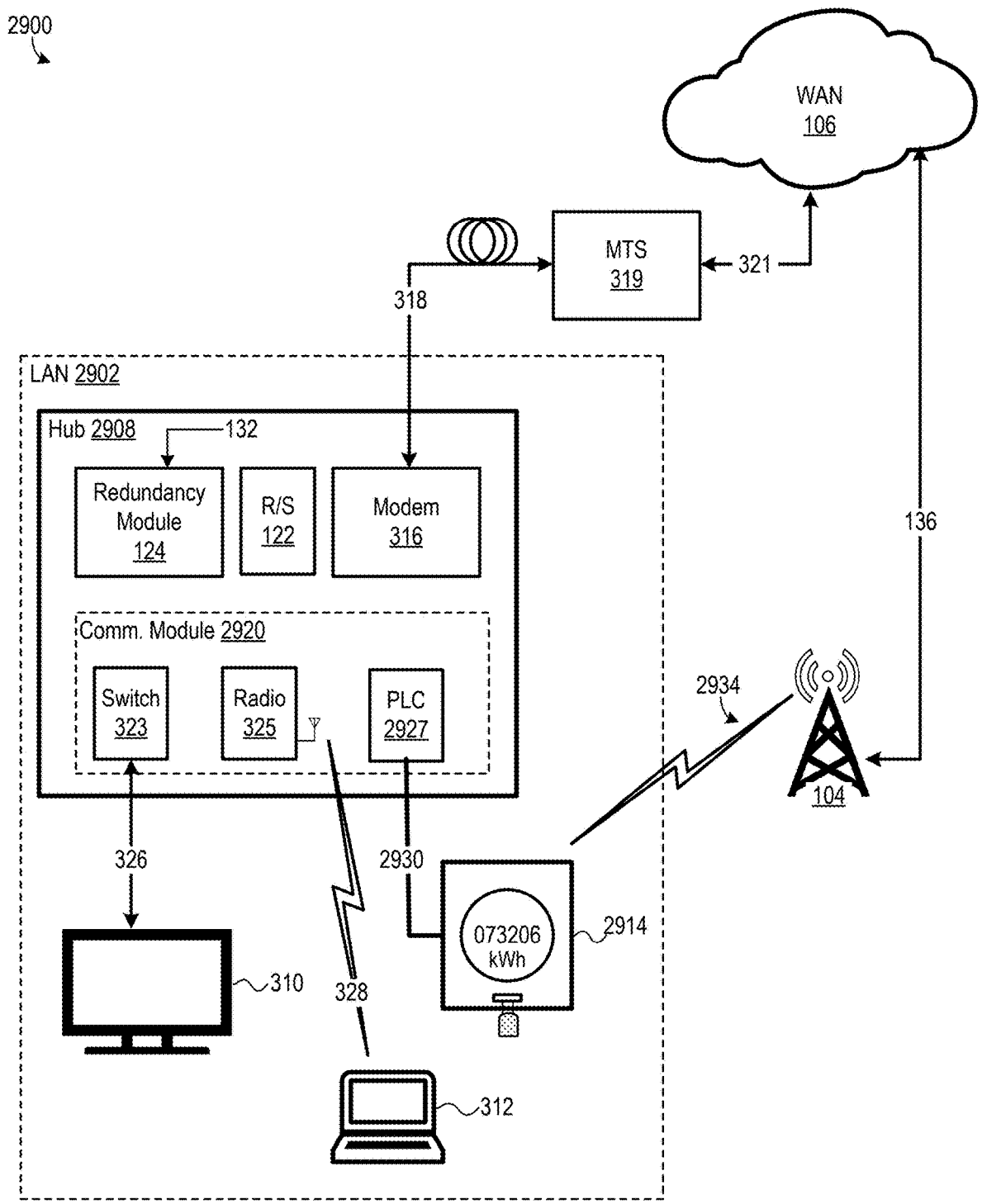
FIG. 29 is a block diagram of an alternate embodiment of the FIG. 3 communication environment where an IoT device in the form of an electric meter may be used to provide a backup WAN communication link.

FIG. 29 is a block diagram of a communication environment 2900, which is an alternate embodiment of communication environment 300 (FIG. 3) where LAN 302 is replaced with a LAN 2902. LAN 2902 is like LAN 302 except that (a) mobile phone 314 is replaced with an electric meter 2914 and (b) hub 308 is replaced with a hub 2908 including a communication module 2920 in place of communication module 320. Communication module 2920 includes a power line communication (PLC) module 2927 in place of second radio 327.

Electric meter 2914 is configured, for example, to track energy usage, such as at a premises including LAN 2902. For instance, FIG. 29 illustrates electric meter 2914 indicating use of 73,206 kilowatt hours (kWh) by the premises including LAN 2902. Additionally, electric meter 2914 is an IoT device, and electric meter 2914 is accordingly communicatively coupled to hub 2908 via a PLC communication link 2930, which may also be considered a LAN communication link. Furthermore, electric meter 2914 includes a radio (not shown) capable of communicating with wireless communication node 104. Accordingly, electric meter 2914 is communicatively coupled to wireless communication node 104 via a wireless communication link 2934. In certain embodiments, wireless communication link 2934 is a cellular wireless communication link (e.g., a cellular wireless communication link operating according to a 3GPP standard, including but not limited to an LTE cellular wireless communication link, a 5G cellular wireless communication link, and/or a 6G cellular wireless communication link). In some other embodiments, wireless communication link 2934 is a Wi-Fi wireless communication link or a LoRa (LoRaWAN) wireless communication link. In another embodiment, communication link 2930 is a wireless communication link (e.g., Wi-Fi, Bluetooth, LoRa, etc.) and PLC 2927 is replaced with a wireless communication radio, or PLC 2927 is not present if another radio in communication module 2920 can communicate over communication link 2930.

Redundancy module 124 is configured to cooperate with electric meter 2914 to establish a backup communication WAN communication link in a matter analogous to how redundancy module 124 cooperates with mobile phone 314 to establish a backup WAN communication link. For example, redundancy module 124 may cooperate with electric meter 2914 to establish a backup WAN communication link including LAN communication link 2930, wireless communication link 2934, and logical communication link 136, in response to redundancy module 124 receiving notification message 132.

Combinations of Features

Features described above may be combined in various ways without departing from the scope hereof. The following examples illustrate some possible combinations.

(A1) A method for automatic redundant connections includes (1) receiving a first notification message indicating a problem with a primary wide area network (WAN) communication link serving a local area network, and (2) in response to receiving the first notification message, establishing a first backup WAN communication link to serve the LAN, using a WAN communication link of a first user equipment device connected to the LAN.

(A2) In the method denoted as (A1), the first notification message may be out-of-band with respect to the LAN.

(A3) In either one of the methods denoted as (A1) and (A2), receiving the first notification message may include receiving the first notification message via the first user equipment device.

(A4) In any one of the methods denoted as (A1) through (A3), the WAN communication link of the first user equipment device may include a cellular wireless communication link.

(A5) In any one of the methods denoted as (A1) through (A4), the WAN communication link of the first user equipment device may include a satellite wireless communication link.

(A6) In any one of the methods denoted as (A1) through (A5), the WAN communication link of the first user equipment device may include a plurality of wireless communication links.

(A7) In any one of the methods denoted as (A1) through (A6), the plurality of wireless communication links may include a plurality of cellular wireless communication links.

(A8) In any one of the methods denoted as (A1) through (A7), the plurality of wireless communication links may include a cellular wireless communication link and a satellite wireless communication link.

(A9) In any one of the methods denoted as (A1) through (A8), the first user equipment device may include a mobile telephone.

(A10) In any one of the methods denoted as (A1) through (A8), the first user equipment device may include a computer.

(A11) In any one of the methods denoted as (A1) through (A8), the first user equipment device may include an Internet of Things (IoT) device.

(A12) In any one of the methods denoted as (A1) through (A11), the first backup WAN communication link may include a Wi-Fi wireless communication link between a hub of the LAN and the first user equipment device.

(A13) In any one of the methods denoted as (A1) through (A11), the first backup WAN communication link may include a communication link selected from the group consisting of a Bluetooth wireless communication link between a hub of the LAN and the first user equipment device, a Zigbee wireless communication link between the hub of the LAN and the first user equipment device, a Z-Wave wireless communication link between the hub of the LAN and the first user equipment device, a Wi-Fi direct wireless communication link between the hub of the LAN and the first user equipment device, and a long range (LoRa) wireless communication link between the hub of the LAN and the first user equipment device.

(A14) In any one of the methods denoted as (A1) through (A11), the first backup WAN communication link may include a power line communication (PLC) communication link between a hub of the LAN and the first user equipment device.

(A15) In any one of the methods denoted as (A1) through (A11), the first backup WAN communication link may include an electrical cable between a hub of the LAN and the first user equipment device.

(A16) In any one of the methods denoted as (A1) through (A15), the method may further include, before establishing the first backup WAN communication link to serve the LAN, (a) ranking a plurality of user equipment devices based on suitability for providing a backup WAN communication link and (b) selecting the first user equipment device for providing the first backup WAN communication link, based on the ranking of the plurality of user equipment devices.

(A17) In any one of the methods denoted as (A1) through (A16), the method may further include, before establishing the first backup WAN communication link to serve the LAN, determining that the first user equipment device is connected to the LAN.

(A18) In any one of the methods denoted as (A1) through (A17), establishing the first backup WAN communication link to serve the LAN may include sending authentication credentials from a hub of the LAN to the first user equipment device.

(A19) In any one of the methods denoted as (A1) through (A18), establishing the first backup WAN communication link to serve the LAN may include sending a request from a hub of the LAN to the first user equipment device for the first user equipment device to serve as a termination device for the WAN communication link of the first user equipment device.

(A20) In any one of the methods denoted as (A1) through (A19), the method may further include establishing a second backup WAN communication link to serve the LAN, using a WAN communication link of a second user equipment device connected to the LAN.

(A21) In any one of the methods denoted as (A1) through (A19), the method may further include switching from the first backup WAN communication link to a second backup WAN communication link to serve the LAN, the second backup WAN communication link using a WAN communication link of a second user equipment device connected to the LAN.

(A22) In any one of the methods denoted as (A1) through (A21), the problem with the primary WAN communication link may include failure of the primary WAN communication link.

(A23) In any one of the methods denoted as (A1) through (A21), the problem with the primary WAN communication link may include degradation of the primary WAN communication link.

(A24) In any one of the methods denoted as (A1) through (A21), the problem with the primary WAN communication link may include a power failure affecting infrastructure supporting the primary WAN communication link.

(A25) In any one of the methods denoted as (A1) through (A24), each of the primary WAN communication link and the first backup WAN communication link may communicatively couple the LAN with the Internet.

(A26) In any one of the methods denoted as (A1) through (A25), the method may further include controlling which one or more clients of the LAN are allowed to use the first backup WAN communication link.

(A27) In any one of the methods denoted as (A1) through (A26), the method may further include controlling what type of traffic is allowed to use the first backup WAN communication link.

(B1) A method for automatic redundant connections includes (1) receiving a first notification message indicating a problem with a primary wide area network (WAN) communication link serving a local area network and (2) in response to receiving the first notification message, establishing a first backup WAN communication link to serve the LAN, using a WAN communication link of a first user equipment device, the first user equipment device being connected to the LAN via a wireless access point of the LAN.

(B2) In the method denoted as (B1), the wireless access point of the LAN may be a range extender of the LAN.

(B3) In the method denoted as (B1), the wireless access point of the LAN may be a node in a mesh wireless network of the LAN.

(C1) A hub for a local area network (LAN) includes (1) a communication module configured to communicatively couple one or more network clients with the hub and (2) a redundancy module configured to (a) receive a first notification message indicating a problem with a primary wide area network (WAN) communication link serving the LAN, and (b) in response to receiving the first notification message, establishing a first backup WAN communication link to serve the LAN, using a WAN communication link of a first user equipment device connected to the LAN.

(C2) In the hub denoted as (C1), the redundancy module may be configured to receive the first notification message from the first user equipment device.

(C3) In either one of the hubs denoted as (C1) and (C2), the hub may further include a detection module configured to (1) detect the problem with the primary WAN communication link and (2) generate the first notification message in response to detecting the problem with the primary WAN communication link.

(C4) In any one of the hubs denoted as (C1) through (C3), the hub may further include a termination device for supporting the primary WAN communication link.

(C5) In the hub denoted as (C4), the termination device may be selected from the group consisting of a wireline modem, a wireless modem, and an optical line terminal (OLT).

Changes may be made in the above methods, devices, and systems without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and system, which as a matter of language, might be said to fall therebetween.

What is claimed is:

1. A method for automatic redundant connections, the method comprising:
   serving a first user equipment device using a local area network (LAN) such that the first user equipment device is a client of the LAN;
   receiving a first notification message indicating a problem with a primary wide area network (WAN) communication link serving the LAN; and
   in response to receiving the first notification message, changing an operating state of the first user equipment device from being a client of LAN to being a termination device of the LAN which interfaces the LAN with a WAN communication link of the first user equipment device, thereby establishing a first backup WAN communication link to serve the LAN, the WAN communication link of the first user equipment device being different from the primary WAN communication link.

2. The method of claim 1, wherein the first notification message is out-of-band with respect to the LAN.

3. The method of claim 1, wherein receiving the first notification message comprises receiving the first notification message via the first user equipment device.

4. The method of claim 1, wherein the WAN communication link of the first user equipment device comprises a cellular wireless communication link.

5. The method of claim 1, wherein the WAN communication link of the first user equipment device comprises a satellite wireless communication link.

6. The method of claim 1, wherein the WAN communication link of the first user equipment device comprises a plurality of wireless communication links.

7. The method of claim 6, wherein the plurality of wireless communication links comprises a plurality of cellular wireless communication links.

8. The method of claim 6, wherein the plurality of wireless communication links comprises a cellular wireless communication link and a satellite wireless communication link.

9. The method of claim 1, wherein the first user equipment device comprises a mobile telephone.

10. The method of claim 1, wherein the first user equipment device comprises a computer.

11. The method of claim 1, wherein the first user equipment device comprises an Internet of Things (IoT) device.

12. The method of claim 1, wherein the first backup WAN communication link comprises a Wi-Fi wireless communication link between a hub of the LAN and the first user equipment device.

13. The method of claim 1, wherein the first backup WAN communication link comprises a communication link selected from the group consisting of a Bluetooth wireless communication link between a hub of the LAN and the first user equipment device, a Zigbee wireless communication link between the hub of the LAN and the first user equipment device, a Z-Wave wireless communication link between the hub of the LAN and the first user equipment device, a Wi-Fi direct wireless communication link between the hub of the LAN and the first user equipment device, and a long range (LoRa) wireless communication link between the hub of the LAN and the first user equipment device.

14. The method of claim 1, wherein the first backup WAN communication link comprises a power line communication (PLC) communication link between a hub of the LAN and the first user equipment device.

15. The method of claim 1, wherein the first backup WAN communication link comprises an electrical cable between a hub of the LAN and the first user equipment device.

16. The method of claim 1, further comprising, before changing the operating state of the first user equipment device from being the client of the LAN to being the termination device of the LAN, (a) ranking a plurality of user equipment devices based on suitability for providing a backup WAN communication link and (b) selecting the first user equipment device for providing the first backup WAN communication link, based on the ranking of the plurality of user equipment devices.

17. The method of claim 1, further comprising, before changing the operating state of the first user equipment device from being the client of the LAN to being the termination device of the LAN, determining that the first user equipment device is connected to the LAN.

18. The method of claim 1, wherein changing the operating state of the first user equipment device from being the client of the LAN to being the termination device of the LAN comprises sending authentication credentials from a hub of the LAN to the first user equipment device.

19. The method of claim 1, wherein changing the operating state of the first user equipment device from being the client of the LAN to being the termination device of the LAN comprises sending a request from a hub of the LAN to the first user equipment device for the first user equipment device to serve as a termination device for the WAN communication link of the first user equipment device.

20. The method of claim 1, further comprising establishing a second backup WAN communication link to serve the LAN, using a WAN communication link of a second user equipment device connected to the LAN, the WAN communication link of the second user equipment device connected to the LAN being different from the primary WAN communication link.

21. The method of claim 1, further comprising switching from the first backup WAN communication link to a second backup WAN communication link to serve the LAN, the second backup WAN communication link using a WAN communication link of a second user equipment device connected to the LAN, the WAN communication link of the second user equipment device connected to the LAN being different from the primary WAN communication link.

22. The method of claim 1, wherein the problem with the primary WAN communication link comprises failure of the primary WAN communication link.

23. The method of claim 1, wherein the problem with the primary WAN communication link comprises degradation of the primary WAN communication link.

24. The method of claim 1, wherein the problem with the primary WAN communication link comprises a power failure affecting infrastructure supporting the primary WAN communication link.

25. The method of claim 1, wherein each of the primary WAN communication link and the first backup WAN communication link communicatively couples the LAN with the Internet.

26. The method of claim 1, further comprising controlling which one or more clients of the LAN are allowed to use the first backup WAN communication link.

27. The method of claim 1, further comprising controlling what type of traffic is allowed to use the first backup WAN communication link.

28. The method of claim 1, wherein:
the method is performed at least partially by a hub for the LAN; and
the first notification message is generated internal to the hub.

29. The method of claim 28, wherein the hub is one of a network gateway and a wireless access point.

30. The method of claim 1, wherein:
the method is performed at least partially by a hub for the LAN; and
the hub receives the first notification message from an external source.

31. The method of claim 30, wherein the hub is one of a network gateway and a wireless access point.

32. The method of claim 1, further comprising conditioning establishing the first backup WAN communication link to serve the LAN on receiving an authorization from a user of the first user equipment device.

33. A method for automatic redundant connections, the method comprising:
serving a first user equipment device using a local area network (LAN) such that the first user equipment device is a client of the LAN;
receiving a first notification message indicating a problem with a primary wide area network (WAN) communication link serving the LAN; and
in response to receiving the first notification message, changing an operating state of the first user equipment device from being a client of the LAN to being a termination device of the LAN which interfaces the LAN with a WAN communication link of the first user equipment device, thereby establishing a first backup WAN communication link to serve the LAN, the first user equipment device being connected to the LAN via a wireless access point of the LAN, and the WAN communication link of the first user equipment device being different from the primary WAN communication link.

34. The method of claim 33, wherein the wireless access point of the LAN is a range extender of the LAN.

35. The method of claim 33, wherein the wireless access point of the LAN is a node in a mesh wireless network of the LAN.

* * * * *